(12) United States Patent
Tamura et al.

(10) Patent No.: US 12,170,620 B2
(45) Date of Patent: *Dec. 17, 2024

(54) POLICY DETERMINATION APPARATUS, POLICY DETERMINING METHOD AND PROGRAM

(71) Applicant: NTT Communications Corporation, Tokyo (JP)

(72) Inventors: Mahoko Tamura, Yokohama (JP); Shintaro Ono, Chigasaki (JP); Yoshiko Kisa, Tokyo (JP); Takayuki Kamei, Funabashi (JP)

(73) Assignee: NTT Communications Corporation, Tokyo (JP)

( * ) Notice: Subject to any disclaimer, the term of this patent is extended or adjusted under 35 U.S.C. 154(b) by 236 days.

This patent is subject to a terminal disclaimer.

(21) Appl. No.: 17/555,232

(22) Filed: Dec. 17, 2021

(65) Prior Publication Data

US 2022/0116328 A1  Apr. 14, 2022

Related U.S. Application Data

(63) Continuation of application No. PCT/JP2020/024015, filed on Jun. 18, 2020.

(30) Foreign Application Priority Data

Jun. 21, 2019  (JP) ................. 2019-115685

(51) Int. Cl.
*H04L 43/08* (2022.01)
*H04L 47/125* (2022.01)
(Continued)

(52) U.S. Cl.
CPC ............ *H04L 47/20* (2013.01); *H04L 47/125* (2013.01); *H04L 47/24* (2013.01)

(58) Field of Classification Search
CPC ....... H04L 43/08; H04L 45/302; H04L 45/70; H04L 47/125; H04L 47/20; H04L 47/24;
(Continued)

(56) References Cited

U.S. PATENT DOCUMENTS 5,970,477 A * 10/1999 Roden ................ G06Q 20/0855
379/112.01
6,968,389 B1 * 11/2005 Menditto ................ H04L 67/61
709/219

(Continued)

FOREIGN PATENT DOCUMENTS

CN       1679359 A     10/2005
CN     101610174 A     12/2009
(Continued)

OTHER PUBLICATIONS

U.S. Appl. No. 17/555,209, filed Dec. 2021, Policy Determination Apparatus, Policy Determining Method And Program.
(Continued)

*Primary Examiner* — Frank Duong
(74) *Attorney, Agent, or Firm* — Knobbe, Martens, Olson & Bear, LLP

(57) ABSTRACT

A policy determination apparatus according to a first aspect of the present invention includes an evaluation unit and a policy determination unit. The evaluation unit evaluates candidates of routing destinations to which a routing control apparatus routes requests, based on time-series data of types of metrics and priorities assigned to the types of metrics to generate routing destination evaluation data, where the types of metrics is generated based on monitoring data relating to the states of facilities on a network and are associated with the candidates. The policy determination unit determines a (Continued)

policy that the routing control apparatus uses for control of the routing destinations after the routing destination evaluation data is generated.

9 Claims, 11 Drawing Sheets

(51) Int. Cl.
*H04L 47/20* (2022.01)
*H04L 47/24* (2022.01)

(58) Field of Classification Search
CPC ......... H04L 47/28; H04L 67/06; H04L 67/10; H04L 67/1004; H04L 67/1025; H04L 67/1097; H04L 67/50; H04L 67/535; H04L 67/55; H04L 67/61; H04L 67/63; H04W 24/08; G06F 9/505
See application file for complete search history.

(56) References Cited

U.S. PATENT DOCUMENTS

| | | | |
|---|---|---|---|
| 10,055,262 | B1 | 8/2018 | Thomas |
| 10,261,834 | B2 | 4/2019 | Mecklin et al. |
| 2003/0065762 | A1 | 4/2003 | Stolorz et al. |
| 2004/0022224 | A1 | 2/2004 | Billhartz |
| 2005/0033858 | A1* | 2/2005 | Swildens ............ H04L 67/1008 709/241 |
| 2006/0294219 | A1 | 12/2006 | Ogawa et al. |
| 2007/0263650 | A1 | 11/2007 | Subramania et al. |
| 2008/0215718 | A1* | 9/2008 | Stolorz ................. H04L 67/101 709/223 |
| 2009/0150565 | A1 | 6/2009 | Lucent |
| 2011/0264798 | A1 | 10/2011 | Joshi |
| 2011/0283016 | A1* | 11/2011 | Uchida ................. H04L 47/125 709/235 |
| 2011/0289214 | A1 | 11/2011 | Freedman |
| 2015/0281339 | A1 | 10/2015 | Strassner |
| 2015/0312325 | A1 | 10/2015 | Lowekamp et al. |
| 2015/0365328 | A1 | 12/2015 | Luke et al. |
| 2016/0337426 | A1 | 11/2016 | Shribman et al. |
| 2017/0019335 | A1 | 1/2017 | Schultz et al. |
| 2017/0126789 | A1* | 5/2017 | Kondapalli ......... H04L 41/0672 |
| 2017/0230260 | A1 | 8/2017 | Gueta et al. |
| 2018/0191622 | A1 | 7/2018 | Karthikeyan et al. |
| 2018/0278498 | A1 | 9/2018 | Zeng et al. |
| 2019/0104069 | A1 | 4/2019 | Kommula et al. |
| 2020/0014486 | A1 | 1/2020 | Harrang et al. |
| 2020/0177502 | A1 | 6/2020 | Lucas et al. |
| 2020/0195673 | A1 | 6/2020 | Lee |
| 2020/0314208 | A1 | 10/2020 | Meenan et al. |
| 2022/0109609 | A1 | 4/2022 | Ono et al. |
| 2022/0116316 | A1 | 4/2022 | Kisa et al. |
| 2022/0116324 | A1 | 4/2022 | Kamei |

FOREIGN PATENT DOCUMENTS

| | | |
|---|---|---|
| EP | 1529406 B1 | 5/2012 |
| GB | 2539994 A | 1/2017 |
| JP | 2005-537687 A | 12/2005 |
| JP | 2009-181152 A | 8/2009 |
| JP | 2011-170422 A | 9/2011 |
| JP | 2012-159873 A | 8/2012 |
| JP | 2015-231134 A | 12/2015 |
| WO | WO 2005/034446 A1 | 4/2005 |
| WO | WO 2009/072094 A2 | 6/2009 |
| WO | WO 2017/037768 A1 | 3/2017 |
| WO | WO 2017/119950 A1 | 7/2017 |
| WO | WO 2020/256074 A1 | 12/2020 |
| WO | WO 2020/256075 A1 | 12/2020 |
| WO | WO 2020/256076 A1 | 12/2020 |
| WO | WO 2020/256077 A1 | 12/2020 |

OTHER PUBLICATIONS

U.S. Appl. No. 17/555,184, filed Dec. 17, 2021, Routing Destination Evaluation Apparatus, Routing Destination Evaluating Method And Program.
U.S. Appl. No. 17/555,271, filed Dec. 17, 2021, Policy Determination Apparatus, Policy Determining Method And Program.
PCT International Search Report and Written Opinion for International Application No. PCT/JP2020/024016 dated Aug. 25, 2020, 16 pages.
PCT International Preliminary Report on Patentability for International Application No. PCT/JP2020/024016 dated Dec. 30, 2021, 13 pages.
PCT International Search Report and Written Opinion for International Application No. PCT/JP2020/024017 dated Aug. 25, 2020, 14 pages.
PCT International Preliminary Report on Patentability for International Application No. PCT/JP2020/024017 dated Dec. 30, 2021, 11 pages.
PCT International Search Report and Written Opinion for International Application No. PCT/JP2020/024018, dated Sep. 1, 2020, 11 pages.
PCT International Preliminary Report on Patentability for International Application No. PCT/JP2020/024018, dated Dec. 30, 2021, 9 pages.
PCT International Search Report and Written Opinion for International Application No. PCT/JP2020/024015, dated Aug. 25, 2020, in 14 pages.
PCT International Preliminary Report on Patentability for International Application No. PCT/JP2020/024015, dated Dec. 30, 2021, in 11 pages.
Japanese Office Action for JP Application No. 2019-115693 dated Jun. 6, 2023, 7 pages.
Cloud Native SDx Control Technology; Apr. 2018, [retrieval date Aug. 14, 2020]. https://www.ntt.co.lp/journal/1804/files/JN20180450. pdf (Japanese), https://www.ntt-review.jp/archive/nttechnical.php?contents=ntr201807ral.pdf&mode=show_pdf (English), section "Cloud native SDx control technology", fig. 1, (Hirota, Takeshi et al., "Cloud native SDx control technology", NTT Technical Journal [online]).
Laquerre, Peter et al. Oracle Cloud Infrastructure Load Balancing Classic; Nov. 2018, [retrieval date Aug. 14, 2020], Internet: https://docs.oracle.com/cd/E83857_01/iaas/load-balance-cloud/1brug/index.html, in particular section, section "Creating a load balancer policy", non-official translation ("Using Oracle Cloud Infrastructure Load Balancing Classic E76938-08 [online]").
PCT International Search Report of PCT Application No. PCT/JP2020/024015 dated Aug. 25, 2020, in 6 pages.
Yasukawa, Seisho et al., "Research toward Realizing a Future Network Architecture", NTT Gijutu Journal (NTT Technical Review), Mar. 2018, pp. 23-30.
Extended Search Report for EP Application No. 20825665.1 dated May 9, 2023, 9 pages.
Extended Search Report for EP Application No. 20827422.5 dated Jul. 8, 2022, 10 pages.
Extended Search Report for EP Application No. 20827498.5 dated Jul. 8, 2022, 12 pages.
Extended Search Report for EP Application No. 20826374.9 dated Jun. 21, 2022, 11 pages.
Chinese Office Action for CN Application No. CN 202080045536.9 dated Nov. 23, 2023, 18 pages.

* cited by examiner

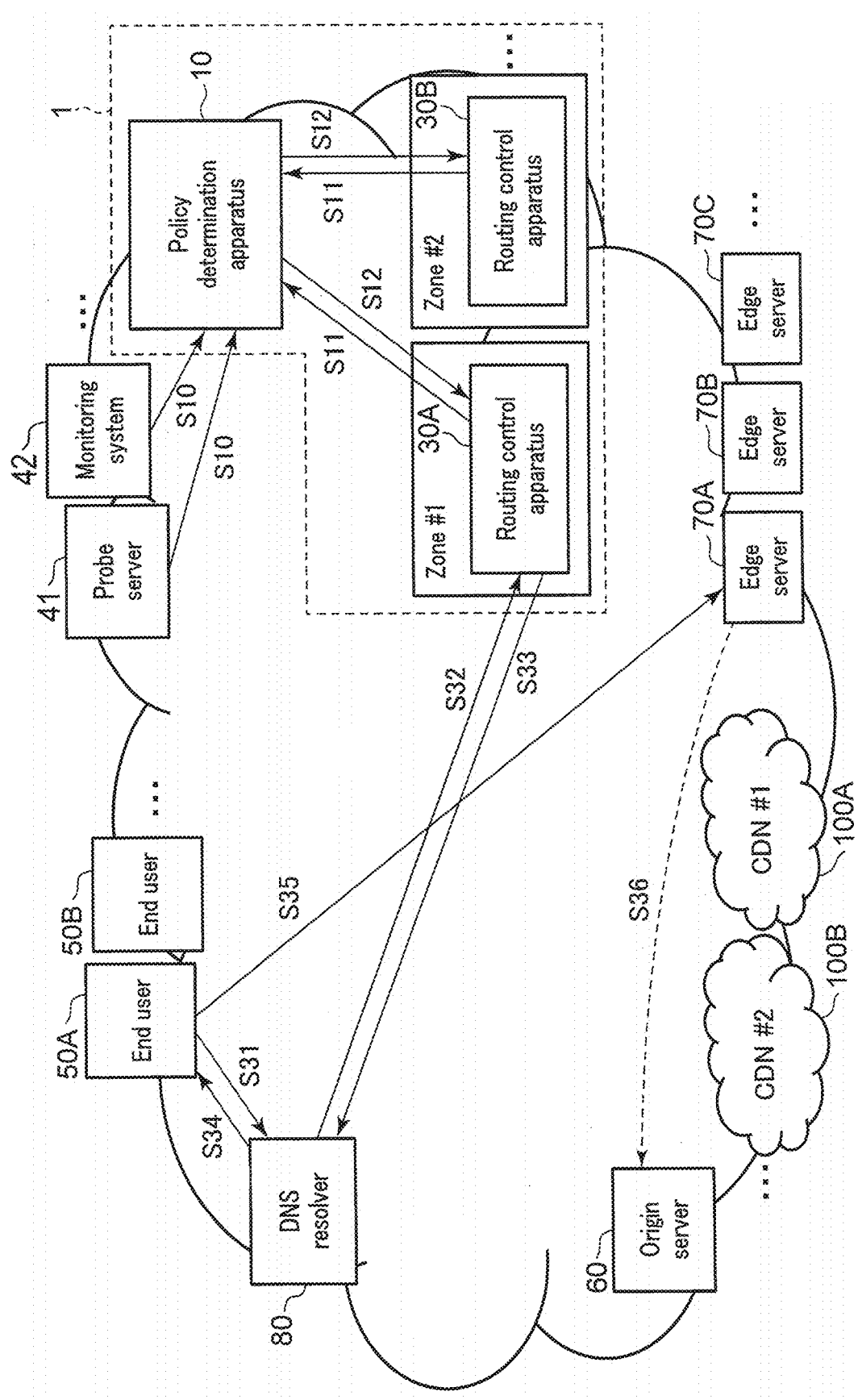
F I G. 1

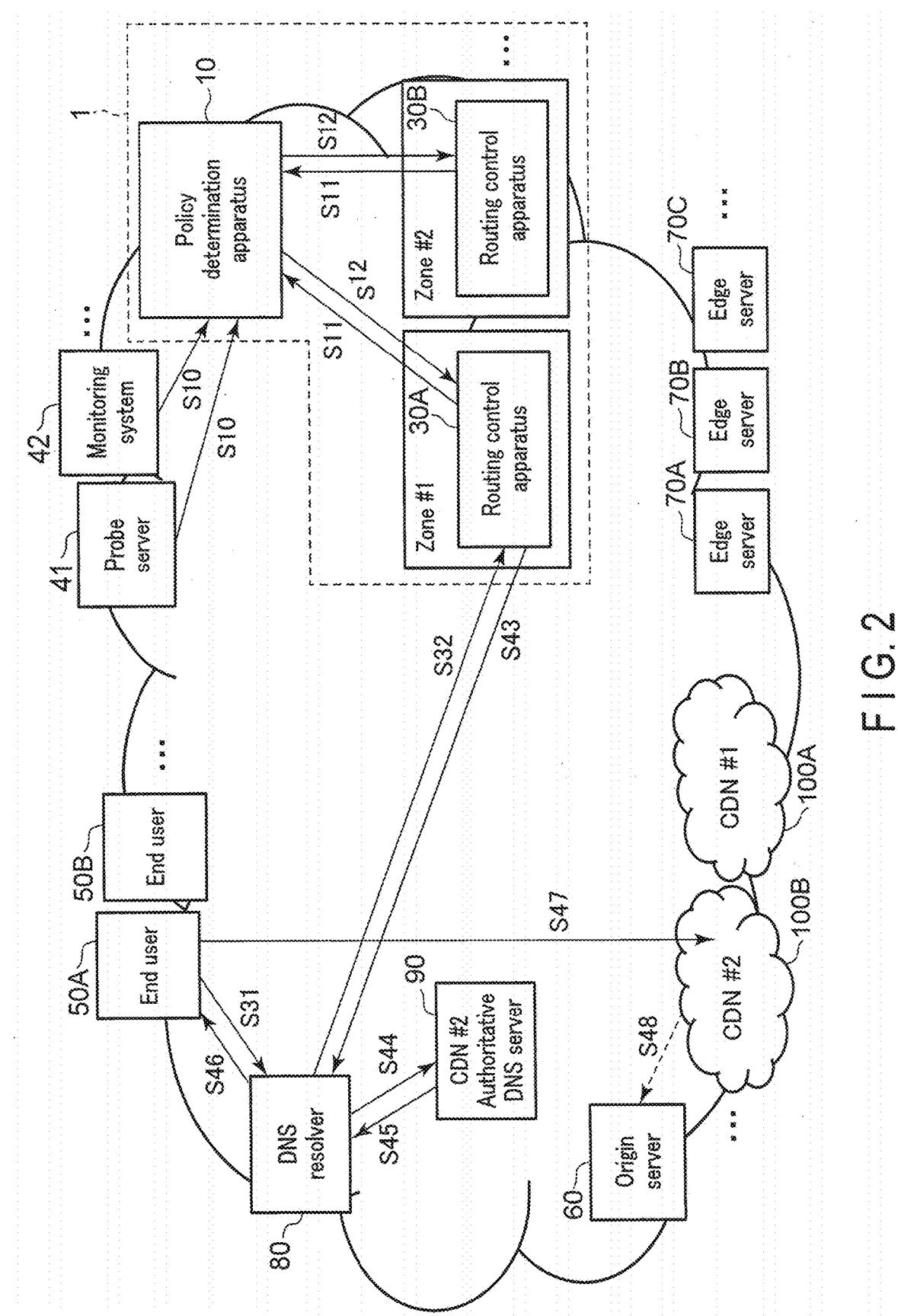
F I G. 2

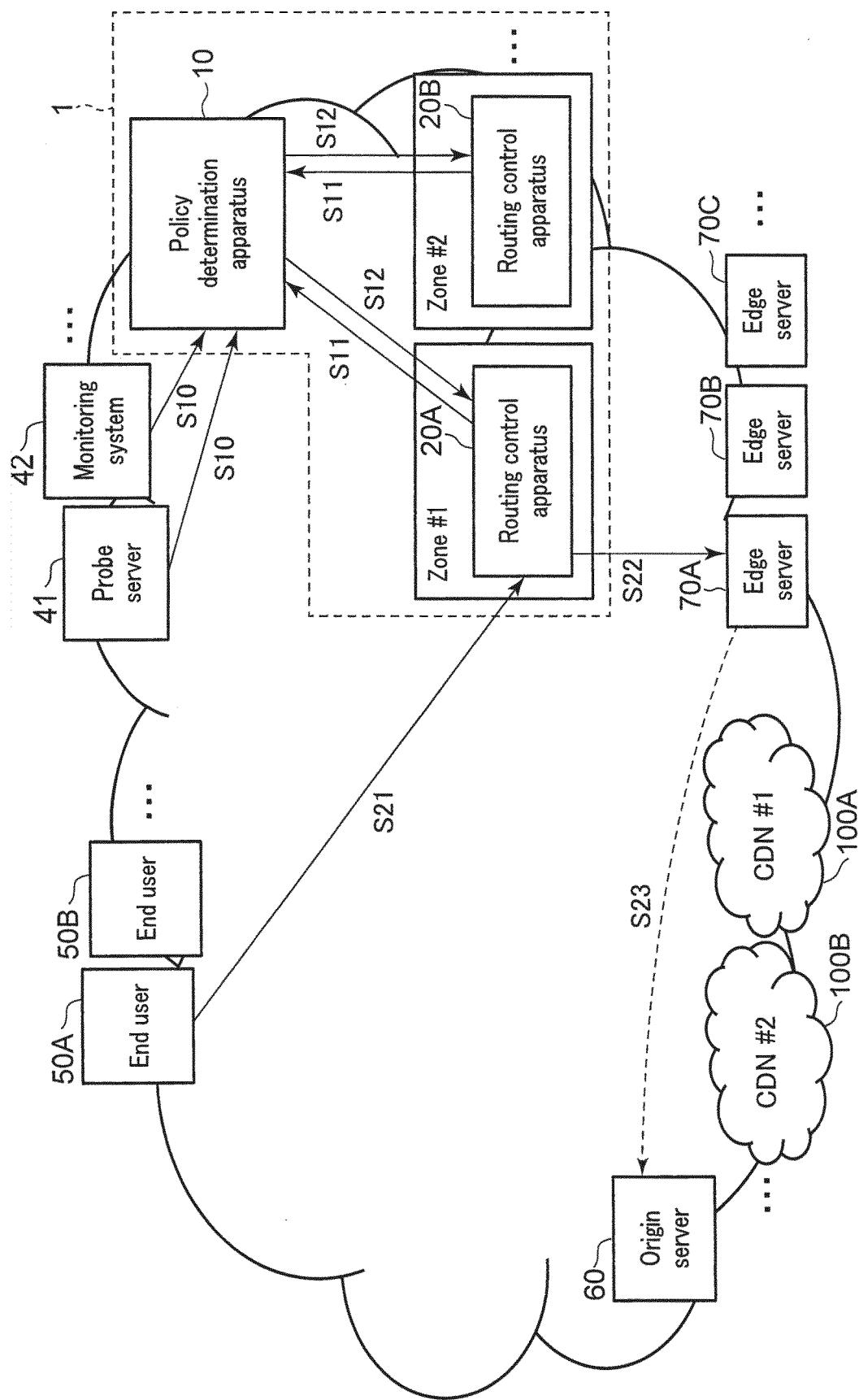
F I G. 3

|  | Availability | RTT | Cost |
|---|---|---|---|
| Edge 1 | ○ | 100 | 500 yen |
| Edge 2 | × | — | 500 yen |
| Edge 3 | ○ | 200 | 300 yen |
| Edge 4 | × | — | 200 yen |
| Edge 5 | ○ | 240 | 400 yen |
| Edge 6 | ○ | 160 | 500 yen |
| Edge 7 | ○ | 160 | 300 yen |
| ⋮ | ⋮ | ⋮ | ⋮ |

FIG. 6

|  | RTT | RTT score | Cost | Cost score |
|---|---|---|---|---|
| Edge 1 | 100 | 0————0.8—1 | 500 yen | 0———0.4————1 |
| Edge 2 | — | 0.0—————————1 | 500 yen | 0———0.4————1 |
| Edge 3 | 200 | 0————0.5————1 | 300 yen | 0————0.6———1 |
| Edge 4 | — | 0.0—————————1 | 200 yen | 0—————0.7—1 |
| Edge 5 | 240 | 0———0.4—————1 | 400 yen | 0—————0.5—1 |
| Edge 6 | 160 | 0—————0.6——1 | 500 yen | 0———0.4————1 |
| Edge 7 | 160 | 0—————0.6——1 | 300 yen | 0————0.6———1 |
| ⋮ | ⋮ | ⋮ | ⋮ | ⋮ |

FIG. 7

|  |  | Standard | Arbitrary |
|---|---|---|---|
| Priority | RTT | 80 | 30 |
|  | Cost | 20 | 70 |
| Number of edges k |  | 2 | 1 |

FIG. 8

|  |  | Edge score |
|---|---|---|
| Edge 1 | 80 × 0.8 + 20 × 0.4 | 72 |
| Edge 2 | 80 × 0.0 + 20 × 0.4 | 8 |
| Edge 3 | 80 × 0.5 + 20 × 0.6 | 52 |
| Edge 4 | 80 × 0.0 + 20 × 0.7 | 14 |
| Edge 5 | 80 × 0.4 + 20 × 0.5 | 42 |
| Edge 6 | 80 × 0.6 + 20 × 0.4 | 56 |
| Edge 7 | 80 × 0.6 + 20 × 0.6 | 60 |
| ⋮ | ⋮ | ⋮ |

F I G. 9

| Edge ranking | Edge score |  | Weight |
|---|---|---|---|
| Edge 1 | 72 | 72/(72+60) | 55% |
| Edge 7 | 60 | 60/(72+60) | 45% |

F I G. 10

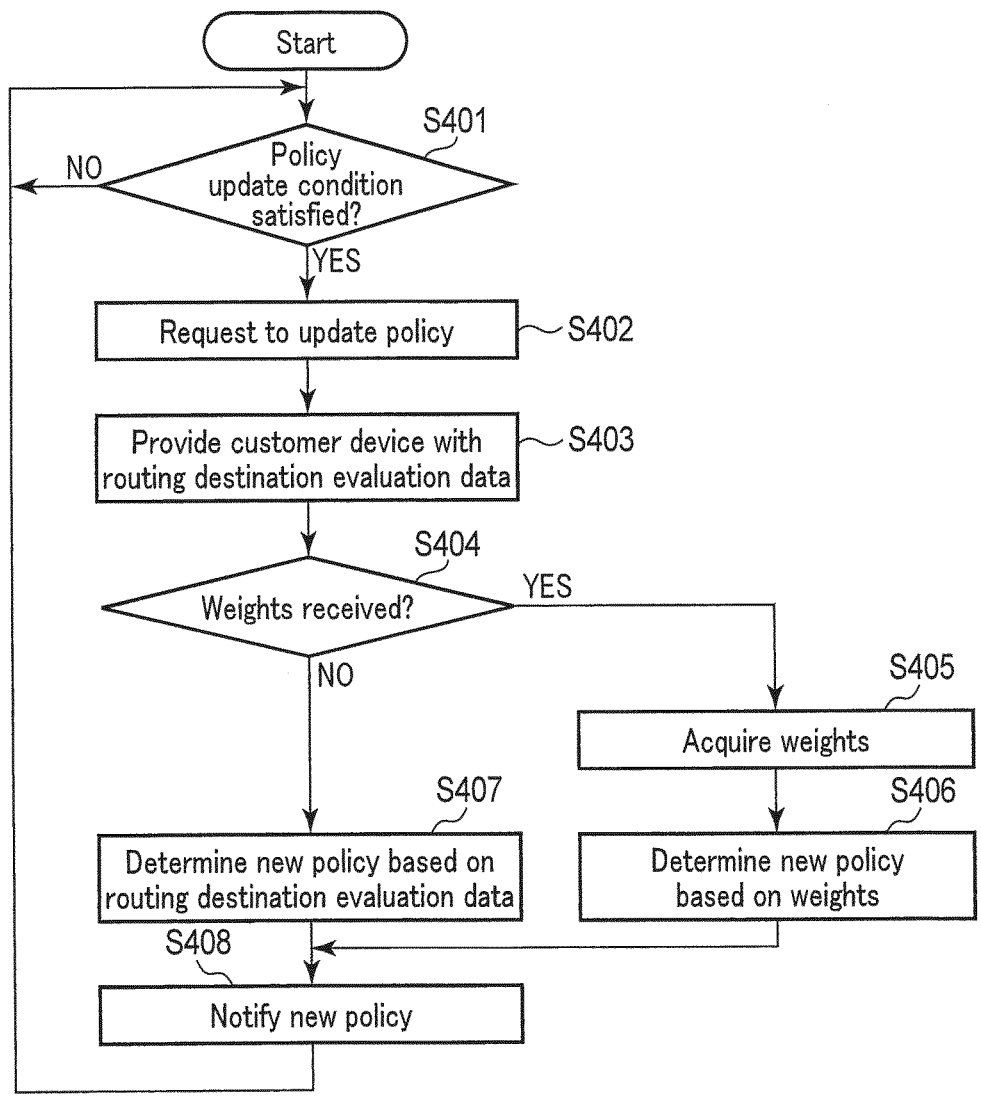
F I G. 13

POLICY DETERMINATION APPARATUS, POLICY DETERMINING METHOD AND PROGRAM

CROSS-REFERENCE TO RELATED APPLICATIONS

This application is a Continuation Application of PCT Application No. PCT/JP2020/024015, filed Jun. 18, 2020 and based upon and claiming the benefit of priority from Japanese Patent Application No. 2019-115685, filed Jun. 21, 2019, the entire contents of all of which are incorporated herein by reference.

FIELD

One aspect of the present invention relates to load distribution on a network.

BACKGROUND

In accordance with the recent development of Internet of Things (IoT) and mobile communication technologies, the volume of data transmitted through the Internet and other networks has been exponentially increasing. For this reason, further developed techniques for network load distribution and traffic control are being sought after.

In a network system, by not forwarding Hypertext Transfer Protocol (HTTP) requests to a single server such as the origin server of a content delivery network (CDN), but rather distributing them to this server and other substitute servers, the expandability and availability of the system can be enhanced. The load distribution technique can be roughly divided into a static distribution scheme and a dynamic distribution scheme: with the former scheme, each request is routed to any one of servers in accordance with a predetermined policy such as round robin and weighted round robin, whereas with the latter scheme, each request is routed to an optimal one of servers while monitoring the states of the servers, such as the number of connections, the number of clients, the volume of data communication, response time, loads on the servers, and the like.

In recent years, the load distribution technique has been applied to the edge computing technique, CDN technique, and the like. Non-patent literature 1 indicates that the CDN technique is now under consideration in order to realize high-quality distributions in an economical manner for next-generation high-definition high-presence video contents, as typified by 4K/8K and AR/VR.

CITATION LIST

Non Patent Literature

[NON PATENT LITERATURE 1] Seisho Yasukawa et al., "Research toward Realizing a Future Network Architecture", NTT Gijutu Journal, March 2018, pages 23 to 30.

SUMMARY

Technical Problem

With the aforementioned static distribution scheme, the load distribution can be realized with a simply policy, but if a change occurs in the states of routing destination candidates, the efficiency may be lowered. In contrast, with the aforementioned dynamic distribution scheme, the load distributing efficiency is not easily lowered even if there is a change in the states of the routing destination candidates. However, a load balancer is required in order to monitor the states of the routing destination candidates in real time and select a routing destination.

The purpose of the present invention is to dynamically determine a policy to be used for controlling the request routing.

Solution to Problem

A policy determination apparatus according to the first aspect of the present invention includes a monitoring data acquisition unit, a metrics generation unit, a routing destination evaluation unit, a policy determination unit, and a policy notification unit. The monitoring data acquisition unit is configured to acquire monitoring data relating to states of facilities on a network, the monitoring data being received from an external device. The metrics generation unit is configured to generate, based on the monitoring data, time-series data of a plurality of types of metrics associated with each of a plurality of candidates of routing destinations to which a routing control apparatus routes requests including first destination data. The routing destination evaluation unit is configured to evaluate the candidates based on the time-series data of the types of metrics associated with the candidates and priorities assigned to the types of metrics to generate routing destination evaluation data. The policy determination unit is configured to determine a policy that the routing control apparatus uses for control of the routing destinations, after the routing destination evaluation data is generated. The policy notification unit is configured to notify the routing control apparatus of the policy. Accordingly, the policy can be dynamically determined.

The policy determination apparatus according to the first aspect of the present invention may further include an evaluation providing unit configured to provide a first customer device with the routing destination evaluation data, the first customer device being authorized to set weights for determining the policy, and a weight acquisition unit configured to acquire weights received from the first customer device, and the policy determination unit may be configured to determine the policy such that the routing control apparatus routes the requests to the candidates in proportions being based on the acquired weights. This policy determination apparatus (hereinafter referred to as the "policy determination apparatus according to the second aspect") is capable of determining a policy that suits the preference of the user (customer) of the first customer device.

The policy determination apparatus according to the second aspect may further include an update condition determination unit configured to determine whether or not a predetermined policy update condition is satisfied, and an update request unit configured to issue a policy update request when the policy update condition is determined to be satisfied, and the policy determination unit is configured to request, in response to the policy update request, the evaluation providing unit to provide the first customer device with a latest version of the routing destination evaluation data. This policy determination apparatus (hereinafter referred to as the "policy determination apparatus according to the third aspect") is capable of providing the latest evaluation data to the customer and prompting the customer to establish weight settings.

In the policy determination apparatus according to the second or third aspect, the weights received from the first customer device may include first weights to be assigned to the candidates in a first time slot, and second weights to be assigned to the candidates in a second time slot that differs from the first time slot, and the policy determination unit may be configured to determine the policy such that the routing control apparatus routes the requests to the candidates in proportions being based on the first weights over the first time slot, and routes the requests to the candidates in proportions being based on the second weights over the second time slot. This policy determination apparatus (hereinafter referred to as the "policy determination apparatus according to the fourth aspect") is capable of determining a policy that suits the preference of the customer in accordance with different time slots.

In the policy determination apparatus according to the second to fourth aspects, the routing destination evaluation data may include evaluation values of the candidates, and the policy determination unit may be configured to, when the weights are not received from the first customer device, determine the policy such that the routing control apparatus routes the requests to the candidates in proportions being based on the evaluation values. This policy determination apparatus (hereinafter referred to as the "policy determination apparatus according to the fifth aspect") is capable of dynamically determining a policy based on the evaluation values even if the customer's weight settings are in arrears.

The policy determination apparatus according to the first to fifth aspects may further include a priority acquisition unit configured to acquire priorities received from a second customer device authorized to set the priorities, and the routing destination evaluation unit may be configured to evaluate the candidates based on the time-series data of the types of metrics associated with the candidates and the acquired priorities to generate the routing destination evaluation data. This policy determination apparatus (hereinafter referred to as the "policy determination apparatus according to the sixth aspect") allows the user (customer) of the second customer device to set priorities that suit his/her own preference so that the influence of the values of the metrics on evaluation can be freely adjusted.

In the policy determination apparatus according to the sixth aspect, the routing destination evaluation data may include evaluation values of the candidates, and the policy determination unit may be configured to determine the policy such that the routing control apparatus routes the requests to the candidates in proportions being based on the evaluation values. This policy determination apparatus (hereinafter referred to as the "policy determination apparatus according to the seventh aspect") is capable of dynamically determining a policy based on the routing destination evaluation data generated in accordance with the standards that suit the customer's preference.

In the policy determination apparatus according to the first to seventh aspects, the types of metrics associated with a first candidate included in the candidates may include first metrics relating to a transmission cost of a request when the first candidate is selected as a routing destination, and second metrics relating to a transmission quality of the request when the first candidate is selected as the routing destination. This policy determination apparatus (hereinafter referred to as the "policy determination apparatus according to the eighth aspect") is capable of evaluating routing destination candidates from multiple points of view including transmission costs and transmission quality.

In the policy determination apparatus according to the first to eighth aspects, the routing destination evaluation unit may be configured to calculate, for each of the candidates, an evaluation value of the candidate by adding values weighted in accordance with the priorities, the values being based on the time-series data of the types of metrics corresponding to the candidate. Accordingly, the influence of each value of the metrics on the evaluation can be adjusted by way of the priorities assigned to the metrics.

A policy determining method according to a ninth aspect of the present invention includes acquiring monitoring data relating to states of facilities on a network, the monitoring data being received from an external device, generating, based on the monitoring data, time-series data of a plurality of types of metrics associated with each of a plurality of candidates of routing destinations to which a routing control apparatus routes requests including first destination data, evaluating the candidates based on the time-series data of the types of metrics associated with the candidates and priorities assigned to the types of metrics to generate routing destination evaluation data, determining a policy that the routing control apparatus uses for control of the routing destinations after the routing destination evaluation data is generated, and notifying the routing control apparatus of the policy. Accordingly, the policy can be dynamically determined.

A policy determining program according to a tenth aspect of the present invention causes a computer to function as means for acquiring monitoring data relating to states of facilities on a network, the monitoring data being received from an external device, means for generating, based on the monitoring data, time-series data of types of metrics associated with each of a plurality of candidates of routing destinations to which a routing control apparatus routes requests including first destination data, means for evaluating the candidates based on the time-series data of the types of metrics associated with the candidates and priorities assigned to the types of metrics to generate routing destination evaluation data, means for determining a policy that the routing control apparatus uses for control of the routing destinations after the routing destination evaluation data is generated, and means for notifying the routing control apparatus of the policy. Accordingly, the policy can be dynamically determined.

Advantageous Effects of Invention

According to the present invention, the policy to be used for controlling the request routing can be dynamically determined.

BRIEF DESCRIPTION OF THE DRAWINGS

FIG. 1 is a diagram showing an exemplary load distribution system including a policy determination apparatus according to the embodiment.

FIG. 2 is a diagram showing an exemplary load distribution system including a policy determination apparatus according to the embodiment.

FIG. 3 is a diagram showing an exemplary load distribution system including a policy determination apparatus according to the embodiment.

FIG. 6 is a diagram showing an exemplary storage content in a monitoring data storage unit illustrated in FIG. 5.

FIG. 7 is a diagram showing an exemplary storage content in a metrics storage unit illustrated in FIG. 5.

FIG. 8 is a diagram showing an exemplary storage content in a setting data storage unit illustrated in FIG. 5.

FIG. 9 is a diagram explaining the operation of a routing destination evaluation unit illustrated in FIG. 5.

FIG. 10 is a diagram explaining the operation of a policy determination unit illustrated in FIG. 5.

FIG. 13 is a flowchart showing an exemplary operation performed by the policy determination apparatus of FIG. 5 in relation to the policy.

DETAILED DESCRIPTION

Figure 4:
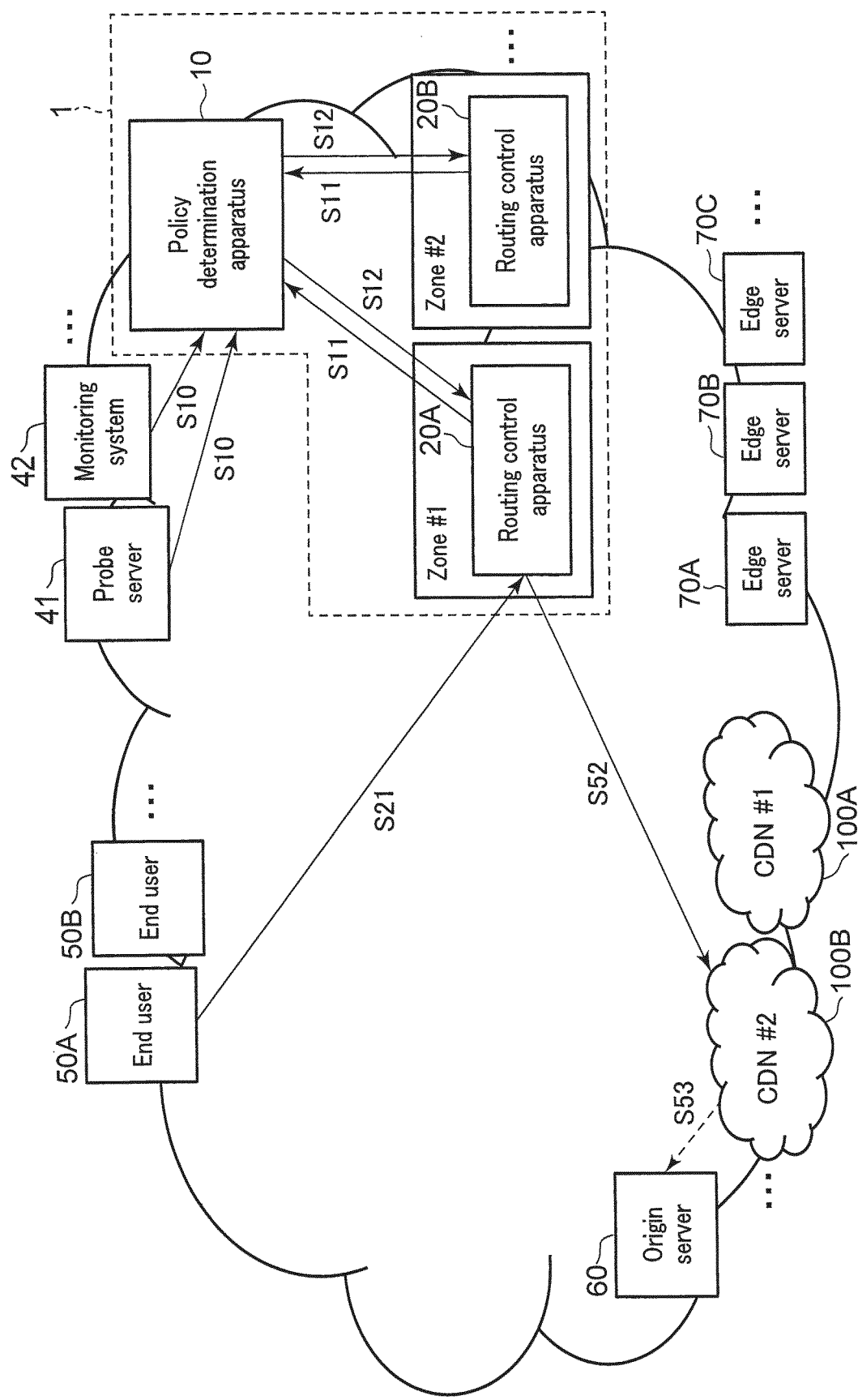
FIG. 4 is a diagram showing an exemplary load distribution system including a policy determination apparatus according to the embodiment.

Embodiments of the present invention will be described below with reference to the drawings. Components that are the same as or similar to already explained components are provided with the same or similar reference signs, and overlapping explanations will be basically omitted.

Embodiments (1) Configuration (1-1) Configuration of Load Distribution System

FIG. 1 is a diagram showing the first example of the overall configuration and the processing flow of a load distribution system including a policy determination apparatus 10 according to the present embodiment.

A routing control system 1 including the policy determination apparatus 10 according to the present embodiment is provided, for example on a web or a cloud, and is connected in a communicable manner through a data transmission network to probe servers 41, monitoring systems 42, end users 50A, 50B, . . . (hereinafter also collectively referred to as "end users 50"), edge servers 70A, 70B, 70C, . . . (hereinafter also collectively referred to as "edge servers 70"), CDNs 100A, 100B, . . . (hereinafter also collectively referred to as "CDNs 100"), and an origin server 60.

The data transmission network includes, for example, a relay network and a plurality of access networks for accessing this relay network. As a relay network, a commonly employed public network such as the Internet, or a closed network that is controlled in a manner such that only limited devices can have access, may be adopted. As an access network, a wireless local area network (LAN), cellular network, wired telephone network, Fiber to the Home (FTTH) network, cable television (CATV) network and the like may be adopted. In the following description, the Internet will be discussed as a data transmission network for the sake of simplicity.

The probe server 41 and/or monitoring system 42 may be a server computer or a personal computer. The probe server 41 and/or monitoring system 42 continuously collects and monitors the states of network facilities such as the origin server 60, edge servers 70 and/or CDNs 100, including log information such as an operation log and security log, and load information such as usage of servers and memories. The probe server 41 and/or monitoring system 42 transmit the monitoring data to the policy determination apparatus 10. Any number of probe servers 41 and/or monitoring systems 42 can be connected to the policy determination apparatus 10 through the network.

Examples of end users 50 include information processing terminals of users such as personal computers and smart phones, vehicles that can establish a connection to a network to transmit and receive information, and IoT devices capable of collecting measurement results from various kinds of sensors and transmitting the results. Access requests from the end users 50 therefore include those for downloading data such as video and other contents and software updating programs, and for uploading data such as IoT data. Any number of end users 50 can be connected to a routing control apparatus 30 in the routing control system 1 through the network.

The edge server 70 is implemented by a server computer that has an arbitrary storage capacity and that is capable of caching data. The CDN 100A, which serves as an edge network, may be operated by a first CDN business operator. The CDN 100B and the like may be operated by CDN business operators different from the first CDN business operator. The CDNs 100 are not illustrated as revealing the information on the edge servers therein to the routing control system 1. Some of the CDNs 100, however, may be configured to reveal the information on the edge servers therein to the routing control system 1. In this case, the routing control system 1 may handle the CDN 100 as a routing destination candidate, or the edge servers in the CDN 100 as routing destination candidates.

In the following description, the CDN 100A, CDN 100B, and the like, and edge servers 70 accessible from the routing control system 1, may be simply referred to as "edges", which serve as routing destination candidates, or may be collectively referred to as a group of edges. A group of edges may also include cloud computing services provided by service providers, CDNs that partially reveal the interior information, and the like, which are not illustrated. Any number of edges can be connected to the end users 50 through the network.

The origin server 60 is a data server that is operated and managed by a content distributor and that holds contents to be distributed to the end users 50 (allowing the end users 50 to download the data), or a data server that is operated and managed by a business operator, which collects and utilizes the IoT data, and that collects data from the end users 50 (allowing the end users 50 to upload the data), such as a web server or a file server. The drawing shows only one origin server 60, but any number of origin servers 60 may be included.

With regard to access requests from the end users 50, the routing control system 1 selects a suitable routing destination from the group of edges including the CDNs 100 or edge servers 70, and routes the requests. In particular, the policy determination apparatus 10 in the routing control system 1 determines a policy to be used for controlling the routing destinations to which the requests are routed, and the routing control apparatus 30 in the routing control system 1 routes the requests in accordance with this policy. The policy here may indicate a plurality of request routing destination candidates and proportions in which the requests are routed to candidates. The routing control apparatus 30 may use these proportions as weights for the weighted round robin when sorting the requests.

The routing control system 1 includes the policy determination apparatus 10, and the routing control apparatuses 30A, 30B, . . . (hereinafter collectively referred to as the "routing control apparatuses 30"). The routing control system 1 may include any number of routing control apparatuses 30.

The policy determination apparatus 10 may be a server computer or a personal computer, and is configured to collect monitoring data from the probe server 41 and/or monitoring system 42 and determine (generate/update) a policy based on items of metrics derived or calculated from the monitoring data.

The metrics here denotes an indicator used for evaluation of selectable candidates as request routing destinations, the indicator indicating the state of each candidate. The metrics may be a value as-is contained in the monitoring data, or a manipulated value or statistical value of the contained value.

The policy determination apparatus 10 may be further configured to determine a policy based on a request from a customer who is a service provider using the origin server 60. For instance, the policy determination apparatus 10 may evaluate the routing destination candidates by considering the metrics of the routing destination candidates with reference to the standards corresponding to the priorities designated by a customer device, and thereby determine the policy. Alternatively, the policy determination apparatus 10 may determine a policy in a manner such that the requests are routed to the candidates in proportions based on the weights set by the customer device.

The customer device here indicates a device authorized to set weights for determining a policy to be applied to the requests including destination data to the origin server 60 and/or the priorities to be assigned to the metrics relating to the evaluation for determining this policy. For instance, in accordance with the operation performed by the operator of the origin server 60, terminals connected to the intra-office network or to a public network make access to the web site (portal site) for establishing the setting. These terminals are authorized by passing authentication such as password authentication, and serve as customer devices during the authorization period. The customer devices are allowed to browse evaluation data (e.g., ranking data) of the routing destination candidates and to set the weights and/or priorities.

As described above, the policy determination apparatus 10 serves as a brain of the routing control system 1, designating a policy that indicates how the routing control apparatus 30 should select a routing destination.

On the other hand, the routing control apparatuses 30 implement a routing control process to actualize the routing control system 1, in accordance with the policy determined by the centrally situated policy determination apparatus 10. The routing control apparatus 30 may correspond to an L4 load balancer (also referred to as a DNS load balancer). The routing control apparatuses 30A, 30B, . . . are assigned to the first zone #1, second zone #2, . . . , respectively. A zone is defined for each routing control apparatus 30 so that the routing control apparatus 30 can route the requests to the Point of Presence (PoP) belonging to the corresponding zone. The PoP denotes the base of routing destinations having an access point to an external network.

(1-2) Policy Determination Apparatus

Figure 5:
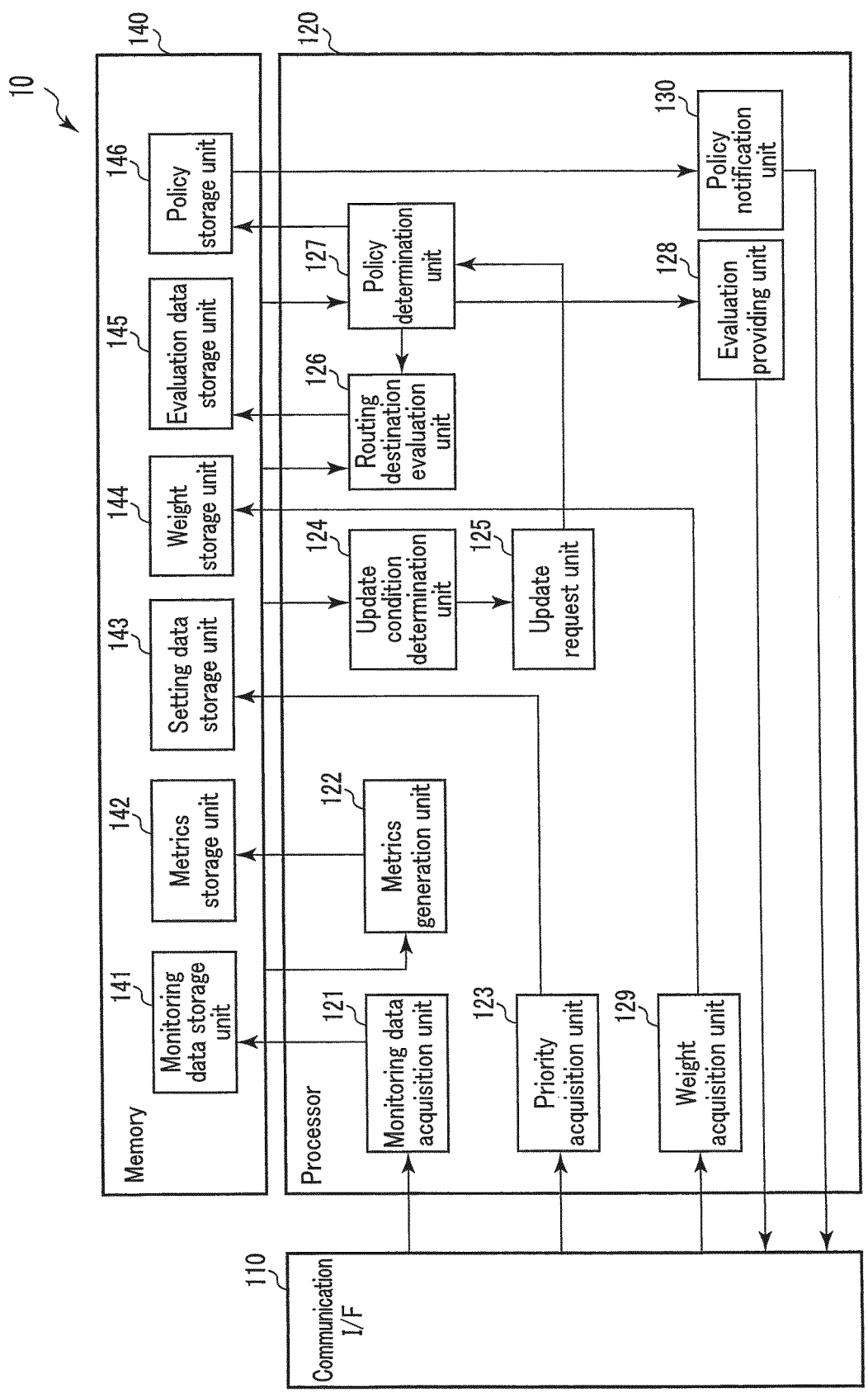
FIG. 5 is a block diagram showing an exemplary policy determination apparatus according to the embodiment.

FIG. 5 is a block diagram showing an example of the policy determination apparatus 10 according to the present embodiment. In "(1-2) policy determination apparatus", as well as "(2-4) operation of policy determination apparatus" and "(2-5) determination of time slot-specific policy", which are described later, the routing control apparatus 20 and routing control apparatus 30 are basically not distinguished from each other, and will be referred to as routing control apparatuses 20.

As illustrated in FIG. 5, the policy determination apparatus 10 according to the present embodiment includes a communication interface (I/F) 110, a processor 120, and a memory 140.

The communication I/F 110 may include one or more wired or wireless communication interface units, enabling transmission and reception of information between the probe server 41 and/or monitoring system 42, and not-shown other external devices such as customer devices in accordance with a communication protocol used for the network. The communication I/F 110 is also used for data communications with the routing control apparatuses 20. The communication I/F 110 may be an optical communication module.

The processor 120 is typically a central processing unit (CPU) and/or a graphics processing unit (GPU). The processor 120 may also be a microcomputer, a field programmable gate array (FPGA), a digital signal processor (DSP), or any other general-purpose or dedicated processor. The processor 120 may perform processing relating to input/output control, communication control, policy determination, and the like.

The memory 140 temporarily stores programs to be executed by the processor 120, with which the processor 120 can implement the processing, and data to be used by the processor 120, such as monitoring data, metrics data, setting data, routing destination evaluation data, weights, and policies. The memory may include a random access memory (RAM) having a work area onto which the program or data is loaded.

By executing the program stored in the memory 140, the processor 120 may function as a monitoring data acquisition unit 121, a metrics generation unit 122, a priority acquisition unit 123, an update condition determination unit 124, an update request unit 125, a routing destination evaluation unit 126, a policy determination unit 127, an evaluation providing unit 128, a weight acquisition unit 129, and a policy notification unit 130 illustrated in FIG. 5. The memory 140 may include a monitoring data storage unit 141, a metrics storage unit 142, a setting data storage unit 143, a weight storage unit 144, an evaluation data storage unit 145, and a policy storage unit 146 illustrated in FIG. 5.

The communication I/F 110 is configured to receive various kinds of data from external devices and forward it to the processor 120, or to transmit various kinds of data received from the processor 120 to external devices.

For instance, the communication I/F 110 receives monitoring data relating to the states of the facilities on a network from the probe server 41 or monitoring system 42 via the network, and forwards this to the monitoring data acquisition unit 121. Here, the monitoring data may include data indicating the states of candidates, such as edge servers 70 and/or CDNs 100, which can be selected as a routing destination of a request including destination data from an end user 50 to the origin server 60 by the routing control apparatuses 20 subordinate to the policy determination apparatus 10. The states of the routing destination candidates here may include, or may not include, part or all of the loads of the candidates, response time (e.g., round-trip time (RTT)), costs (communication charges), availability, the number of connections, the number of clients, volume of data communications, and the like.

Furthermore, the communication I/F 110 receives from the policy notification unit 130 the policy and the data (e.g., address) for identifying a routing control apparatus 20 that is a policy notification destination and that is subordinate to the policy determination apparatus 10, and transmits the policy to this routing control apparatus 20 via a network. This policy is used by the routing control apparatus 20 that is the notification destination to regulate the destinations for routing the requests including the destination data from the end users 50 to the origin server 60.

The communication I/F 110 further receives the routing destination evaluation data from the evaluation providing unit 128, and transmits this routing destination evaluation data to a customer device or some other external device via the network. The communication I/F 110 also receives the priorities from the customer device or external device via the network, and forwards them to the priority acquisition unit 123. The communication I/F 110 receives weights from the customer device or external device via the network, and forwards them to the weight acquisition unit 129.

The monitoring data acquisition unit 121 acquires the monitoring data received by the communication I/F 110, and writes this data into the monitoring data storage unit 141 of the memory 140.

The monitoring data storage unit 141 stores the monitoring data acquired by the monitoring data acquisition unit 121. The monitoring data stored in the monitoring data storage unit 141 may be read out by the metrics generation unit 122.

The monitoring data storage unit 141 stores the monitoring data in association with respective edges. FIG. 6 is a diagram showing an exemplary content stored in this monitoring data storage unit 141. The monitoring data storage unit 141 stores similar information for every origin server 60. A table is illustrated here, which is not a limitation. The monitoring data storage unit 141 stores information of defined metrics such as a quality including availability and round-trip time (RTT), a cost, and the like, for each edge. The cost denotes a value calculated based on various fees including transit fees corresponding to the volume of data transmission and reception and electric power charges for running the edge servers. The monitoring data may be throughputs, the number of requests or any other types of data, and any information acquirable at the probe server 41 and/or monitoring system 42 can be adopted. The monitoring data can be freely determined by the server of a company or organization that runs and manages this routing control system 1, or by the origin server 60 or customer device that is run and managed by a content distributor or an IoT data collecting business operator.

The metrics generation unit 122 reads the monitoring data stored in the monitoring data storage unit 141, and generates, based on the monitoring data, time-series data (metrics data) of multiple types of metrics associated with each of the routing destination candidates. The metrics generation unit 122 stores the generated metrics data in the metrics storage unit 142.

As mentioned above, the metrics are an indicator that indicates the state of a candidate selectable as a request routing destination. The metrics data is expressed by time stamps and metrics values. The metrics at a given time point may be a value as-is contained in the monitoring data, or a manipulated value or statistical value of this contained value. The metrics generation unit 122 may generate metrics for every unit of time, for example, every second.

The metrics generation unit 122 may normalize the metrics value of a given type at a given time point, for example as a score between 0 and 1. The metrics generation unit 122 may use a sigmoid function to normalize the metrics value. The normalized metrics value may be referred to as a (metrics) score.

The metrics associated with a given routing destination candidate may include first metrics relating to the transmission cost of the request when selecting this candidate as a routing destination, second metrics relating to the transmission quality of the request when selecting this candidate as a routing destination, and the like. The first metrics may be various costs incurred when the candidate is selected, such as CDN charge as a candidate, electric power charge of the edge server as a candidate, and the like. The second metrics may be availability of the edge, RTT, packet loss rate, and the like.

The metrics storage unit 142 may store, as metrics data, multiple types of metrics values of the candidates and/or their scores at each time point in association with the routing destination candidates. FIG. 7 shows an example of RTT and a cost corresponding to the metrics, as well as their scores, for each routing destination candidate (edge). Here, the metrics data is indicated in the form of a table, which is not a limitation. The metrics storage unit 142 may store a value and a score for each edge and for each item of the metrics. The metrics data stored in the metrics storage unit 142 may be read out by the update condition determination unit 124, routing destination evaluation unit 126, and/or policy determination unit 127.

The setting data storage unit 143 stores various types of setting data. The setting data here may include parameters relating to the policy determination, data of the routing control apparatuses 20 subordinate to the policy determination apparatus 10, data relating to the routing destination candidates selectable for the routing control apparatus 20, and the like.

The parameters relating to the policy determination may include priorities assigned to respective items of the metrics, which are used for scoring the routing destination candidates with a weighted sum of the metrics, parameters (designated number of edges) designating the number of routing destination candidates that can be included in the policy and/or later-mentioned ranking, various threshold values, and the like.

The setting data storage unit 143 stores various parameters. These parameters include standard values designated by the server of a company or organization that runs and manages this routing control system 1 or by the origin server 60 or customer device run and managed by a content distributor or an IoT data collecting business operator. The parameters may also include arbitrary values set through the API or the like by an external device that requires the later-mentioned routing destination evaluation data. These arbitrary values are acquired from the customer device or other external device via the communication I/F 110 and stored in the setting data storage unit 143 by the priority acquisition unit 123. FIG. 8 is a diagram showing an exemplary content stored in the setting data storage unit 143. The setting data storage unit 143 stores similar information for every origin server 60. The setting data storage unit 143 stores the priorities and the designated number of edges k. In this example, priorities are set with respect to two types of metrics, RTT and a cost. The metrics for which the priorities are set, however, are not limited to these, and the number of metrics types is also not limited to two.

The priority acquisition unit 123 acquires the priorities received by the communication I/F 110, and writes these into the setting data storage unit 143 of the memory 140. For instance, the priority acquisition unit 123 may register the received priorities as arbitrary values of the priorities indicated in FIG. 8. The priority acquisition unit 123 may acquire parameters other than priorities, such as the designated number of edges. If this is the case, the priority acquisition unit may be instead referred to as a parameter acquisition unit. The routing destination evaluation unit 126 may evaluate a routing destination candidate using the standard values if the arbitrary values are not registered for the parameters, and using the arbitrary values if the arbitrary values have been registered for the parameters.

The update condition determination unit 124 determines whether or not a predetermined policy update condition is satisfied. When it is determined that the policy update condition is satisfied, the update condition determination unit 124 notifies the update request unit 125 that the policy update condition has been satisfied. If there are a plurality of routing control apparatuses 20 subordinate to the policy determination apparatus 10, the update condition determination unit 124 may determine, for each of the routing control apparatuses 20, whether or not the policy update condition of the policy used by the routing control apparatus 20 is satisfied.

For instance, the policy update condition may be that the metrics and/or their scores stored in the metrics storage unit 142 either have been changed or have changed beyond a threshold value. Alternatively, the policy update condition may be that a length of time that exceeds a threshold value has elapsed after the previous policy update (or determination). The policy update condition may be that a policy update request is received from a routing control apparatus 20 subordinate to the policy determination apparatus 10 and is stored in the memory 140.

Upon the notification from the update condition determination unit 124 of the policy update condition being satisfied, the update request unit 125 sends a request for a policy update to the policy determination unit 127.

The routing destination evaluation unit 126 reads the metrics data from the metrics storage unit 142, and the parameters including priorities from the setting data storage unit 143. Based on the metrics data and parameters, the routing destination evaluation unit 126 evaluates the routing destination candidates to generate the routing destination evaluation data. The routing destination evaluation unit 126 stores the routing destination evaluation data in the evaluation data storage unit 145.

The routing destination evaluation unit 126 may regularly perform evaluations of the routing destination candidates, or may be triggered by a request from the policy determination unit 127 to evaluate the routing destination candidates.

The routing destination evaluation unit 126 can evaluate the routing destination candidates based on the time-series data of multiple types of metrics associated with these candidates, and the priorities assigned to the metrics of these types. For instance, the routing destination evaluation unit 126 may determine the evaluation value (edge score) of each routing destination candidate by adding (the scores of) multiple types of metrics of the candidate weighted in accordance with the priorities assigned to the respective types of the metrics. An example of scoring is shown in FIG. 9. "Edge 1", "Edge 2", . . . , and "Edge 7" in FIG. 9 correspond to the routing destination candidates, and the priorities assigned to the "RTT score" and "cost score" are "0.8" and "0.2", respectively. The priorities may be set in accordance with the preferences of the administrator of the policy determination apparatus 10, routing control apparatus 20, and/or origin server 60. In the example of FIG. 9, greater importance is placed on "RTT" than "cost". However, greater importance may be placed on "cost" instead, or on (the scores of) metrics other than "cost" and "RTT".

The routing destination evaluation data includes, for example, a plurality of routing destination candidates and their evaluation values (edge scores). Furthermore, the routing destination evaluation data may be ranking data in which routing destination candidates are ranked in ascending or descending order of their evaluation values.

When generating ranking data as routing destination evaluation data, the routing destination evaluation unit 126 does not need to include all the edges in the ranking. In particular, the routing destination evaluation unit 126 may take the edges having the first to k-th scores into consideration for the ranking in accordance with the designated number of edges k, which is one of the parameters stored in the setting data storage unit 143, or may eliminate candidates that are not in an available state.

The evaluation data storage unit 145 stores the routing destination evaluation data generated by the routing destination evaluation unit 126. The routing destination evaluation data stored in the evaluation data storage unit 145 is read out by function units of the processor 120 such as the policy determination unit 127 and evaluation providing unit 128.

The policy determination unit 127 determines the policy based on the various types of data stored in the memory 140 and writes it into the policy storage unit 146 at the time of, for example, initial setting of the policy determination apparatus 10, setting of an additional routing control apparatus 20 subordinate to the policy determination apparatus 10, or a request for a policy update received from the update request unit 125. To determine the policy, the policy determination unit 127 may refer to the metrics stored in the metrics storage unit 142, setting data stored in the setting data storage unit 143, weights stored in the weight storage unit 144, and/or routing destination evaluation data stored in the evaluation data storage unit 145. Before determining the policy, the policy determination unit 127 may request the routing destination evaluation unit 126 to generate the latest routing destination evaluation data.

The policy determination unit 127 may determine the policy based on the weights stored in the weight storage unit 144. In this case, the policy determination unit 127 may request the evaluation providing unit 128 to provide a customer device with the latest routing destination evaluation data in order to prompt the customer to input weights. In contrast, when weights are not stored in the weight storage unit 144, or as default settings, the policy determination unit 127 may autonomously determine the policy based on the routing destination evaluation data.

When autonomously determining the policy, the policy determination unit 127 may narrow down the routing destination candidates to be included in the policy, based on the scores of the routing destination candidates and/or the availability or other metrics of the candidates. For instance, the policy determination unit 127 may eliminate candidates having (edge) scores ranked in a place below the predetermined ordinal place, such as a place corresponding to the designated number of edges, in the routing destination evaluation data. Alternatively, the policy determination unit 127 may eliminate candidates having scores lower than a predetermined threshold value, or candidates that are not in the available state.

The policy determination unit 127 determines, based on the scores of the routing destination candidates included in the routing destination evaluation data or weights stored in the weight storage unit 144, weights indicating the proportions of the candidates to which the routing control apparatus 20 that will use the to-be-determined policy routes the requests. The policy determination unit 127 may describe the weights stored in the weight storage unit 144 as they are in the policy, or determine, as the weight of the candidate, the ratio of the weight assigned to a candidate to the total weights assigned to all the routing destination candidates. Alternatively, as indicated in FIG. 10, the policy determination unit 127 may determine, as the weight of each candidate, the ratio of the score of a candidate to the total score of all the routing destination candidates to be included in the policy. These are exemplary methods for determining weights. The weights may be predetermined in accordance with the order of scores. The weights may be used as weights for the weighted round robin scheme in the load distribution technique. That is, the routing control apparatus 20 that uses the policy of FIG. 10 routes 55% of the requests to the edge 1, and the remaining 45% to the edge 7.

The policy storage unit 146 stores the policy determined by the policy determination unit 127. The policy stored in the policy storage unit 146 is read out, for example, by the policy notification unit 130.

In response to a request from the policy determination unit 127, the evaluation providing unit 128 provides a customer device or other external device with the routing destination evaluation data by way of the communication I/F 110. If the policy determination unit 127 does not determine a policy based on the weights set by a customer device, the evaluation providing unit 128 may not be required.

The weight acquisition unit 129 acquires weights received from the customer device by way of the communication I/F 110, and writes them into the weight storage unit 144 of the memory 140. If the policy determination unit 127 does not determine a policy based on the weights set by the customer device, the weight acquisition unit 129 may not be required. The weights are assigned to at least some of the routing destination candidates, for example, by a customer who has browsed the routing destination evaluation data. Since the weights can be freely set by a customer, they may not always have a correlation with the evaluation values of the candidates in the routing destination evaluation data.

The weight storage unit 144 stores weights acquired by the weight acquisition unit 129. The weights stored in the weight storage unit 144 may be read out by the policy determination unit 127. If the policy determination unit 127 does not determine a policy based on the weights set by a customer device, the weight storage unit 144 may not be required.

When a new policy (including an updated policy) is stored in the policy storage unit 146, the policy notification unit 130 reads this policy out, and notifies the corresponding routing control apparatus 20 of the polity. Specifically, the policy notification unit 130 transmits to the communication I/F 110 the policy and the data that identifies the routing control apparatus 20 to which the policy is addressed, and the communication I/F 110 transmits the policy to this routing control apparatus 20 via a network.

(2) Operations

Next, the information processing operation of the load distribution system including the policy determination apparatus 10 and routing control apparatus 30 as configured as above will be explained.

(2-1) Policy Determination (S10 to S12)

First, the policy determination processing will be explained with reference to FIG. 1.

According to the embodiment, first, at step S10, the policy determination apparatus 10 monitors the usage and performance of the facilities on the network by continuously collecting the monitoring data from the probe server 41 and/or monitoring system 42. Alternatively, the policy determination apparatus 10 may directly collect information representing the loads of the CDNs 100 or edge servers 70, or receive it by way of the routing control apparatus 30.

In contrast, the policy determination apparatus 10 receives a policy update (or generation) request from the routing control apparatus 30 (step S11). This request may be output regularly from the routing control apparatus 30, or may be output from the routing control apparatus 30, triggered by a change to the configuration of the edges relating to a zone. Together with a policy update request, the routing control apparatus 30 may transmit the acquired information relating to the CDNs 100, edge servers 70 or origin server 60 to the policy determination apparatus 10.

Next, at step S12, the policy determination apparatus 10 determines a policy based on the monitoring data collected previously at step S10, and thereafter performs an operation of returning the latest policy to the routing control apparatus 30. The policy determination apparatus 10 derives or calculates multiple types of metrics from the collected information, and generates or updates a policy based on the calculated metrics.

For instance, the monitoring data collected by the policy determination apparatus 10 may include, as dynamic data, an operation log and monitoring results of the states of networks, and, as static data, preference standards determined by a customer, contract descriptions, contract fees for each CDN and the like. The policy determination apparatus 10 may acquire the schedule for distributing the data held by the origin server 60, and, based on the acquired distribution schedule, may determine a policy designating a specific edge to be selected on a priority basis for a time slot in which specific data is distributed. Alternatively, the policy determination apparatus 10 may acquire priorities (preference standards) of the metrics and/or weights of edges (proportions of routing), and evaluate the routing destination candidates according to the priorities and/or the weights. The policy may be determined separately for respective origin servers 60, or commonly for multiple origin servers.

The policy determination apparatus 10 may regularly determine a policy for the routing control apparatuses 30, and report it to the routing control apparatuses 30, without using a policy update request from the routing control apparatus 30 at step S11 as a trigger as indicated above. That is, the policy determination apparatus 10 may regularly derive or calculate multiple types of metrics from the collected monitoring data, and generate or update the policy based on the calculated metrics.

(2-2) Routing Control by DNS-Based Routing Control Apparatus

Next, as a first example of routing control, the procedure and details of the request routing control performed by a DNS-based routing control apparatus 30 will be explained with reference to FIG. 1.

(2-2-1) Example 1-1 (S31 to S36)

When the end user 50A is trying to access the origin server (data server) 60 to request distribution of a content in FIG. 1, the routing control according to Example 1 will be performed as indicated below.

First, at step S31, the end user 50A sends an inquiry, as an access request, about a destination IP address for accessing the origin server 60 (origin.example.com), to the DNS resolver 80 designated by the end user 50A to resolve the name. The DNS resolver 80 may be a specifically designed server, or a program to be implemented by the end user 50A.

Next, at step S32, the DNS resolver 80 that has received the inquiry from the end user 50A sends an inquiry to the routing control apparatus 30A, which is an authoritative DNS server holding the information of origin.example.com. Upon receipt of the inquiry, the routing control apparatus 30A acquires information included in this inquiry as address information. The routing control apparatus 30A, which has received the inquiry about the information of origin.example.com from the DNS resolver 80, further designates the edge server 70A as a routing destination in accordance with the policy determined by the policy determination apparatus 10.

At step S33, the routing control apparatus 30A sends a response regarding the routing destination information to the DNS resolver 80. Here, the routing destination information transmitted from the routing control apparatus 30A to the DNS resolver 80 at step S33 includes the IP address of the edge server 70A.

Next, at step S34, the DNS resolver 80 sends as a response the routing destination information received from the routing control apparatus 30A to the end user 50A.

At step S35, the end user 50A begins to access the edge server 70A, which is the designated routing destination. If the edge server 70A holds the cache of the content requested by the end user 50A, the process is terminated.

If the edge server 70A does not hold the cache of the content requested by the end user 50A, the edge server 70A accesses the origin server 60 at step S36 to acquire the content from the origin server 60.

In this manner, the routing destination designated by the routing control apparatus 30A is allowed to deliver the content held by the origin server 60 to the end user 50A.
(2-2-2) Example 1-2 (S31 to S48)

FIG. 2 is a diagram showing the second example of the overall configuration of the load distribution system including the policy determination apparatus 10 according to the present embodiment and the processing flow of the system. In particular, FIG. 2 shows a flow of a process in which, when the end user 50A is trying to access the origin server 60 to request distribution of a content, the routing control apparatus 30A selects the CDN 100 as a routing destination instead of an edge server 70. Steps S10 to S12 and S31 in FIG. 2 are the same as steps S10 to S12 and S31 in FIG. 1, and therefore these steps are omitted from the explanation.

At step S32, which follows step S31, the DNS resolver 80 that has received an inquiry from the end user 50A sends an inquiry to the routing control apparatus 30A, which is an authoritative DNS server holding the information of origin.example.com. Upon receipt of the inquiry, the routing control apparatus 30A acquires information included in this inquiry as address information. The routing control apparatus 30A, which has received the inquiry about the information of origin.example.com from the DNS resolver 80, further designates the CDN 100B as a routing destination in accordance with the policy determined by the policy determination apparatus 10.

At step S43, the routing control apparatus 30A sends the routing destination information as a response to the DNS resolver 80. Since the IP address of the cache server in the CDN 100B that is the routing destination is unknown for the routing control apparatus 30, the DNS resolver 80 is introduced to the authoritative DNS server 90 of the CDN 100B at step S43.

At step S44, the DNS resolver 80 sends an inquiry to the authoritative DNS server 90 of the CDN 100B about the IP address corresponding to the domain name of the origin server 60.

At step S45, the authoritative DNS server 90 of the CDN 100B returns information regarding a suitable edge server in the CDN 100B to the DNS resolver 80.

At step S46, the DNS resolver 80 sends as a response to the end user 50 the routing destination information received from the authoritative DNS server 90 regarding the edge server of the CDN 100B.

At step S47, the end user 50A begins to access the edge server of the CDN 100B designated as a routing destination. If the edge server holds the cache of the content requested by the end user 50A, the process is terminated.

If the edge server of the CDN 100B does not hold the cache of the content requested by the end user 50A, the edge server accesses the origin server 60 and acquires the content from the origin server 60 at step S48.

In this manner, the routing destination designated by the routing control apparatus 30A is allowed to deliver the content held by the origin server 60 to the end user 50A.

At step S33 in FIG. 1 or at step S43 in FIG. 2, the routing control apparatus 30A may designate, as the routing destination, the origin server 60 instead of an edge server, with respect to the DNS resolver 80.

The end user 50A equally needs to send a request to the origin server 60 or a suitable edge server when the end user 50A wishes to upload data to the origin server 60. The above flow is therefore applicable regardless of whether the flow of the targeted data of a request is in a downstream direction or upstream direction.

The routing control system 1 described above with reference to FIGS. 1 and 2 realizes control of the routing destination of requests from end users 50 in a dynamic and intelligent manner. That is, the policy determination apparatus 10 serves as the brain to dynamically determine the policy based on the collected monitoring data. The routing control apparatus 30 arranged in each zone performs the actual operation, selecting a suitable routing destination from a plurality of edge servers in accordance with the policy defined by the policy determination apparatus 10 serving as the brain.

For instance, with respect to the edge servers to which nonzero values are assigned as proportions according to the policy, the routing control apparatus 30 in the routing control system 1 may use these proportional values as weights for the weighted round robin when sorting the requests. The policy determination apparatus 10 in the routing control system 1 may determine different policies for different time frames, for example between daytime and nighttime.

(2-3) Routing Control by HTTP-Based Routing Control Apparatus

Next, as the second example of the routing control, the request routing control performed by an HTTP-based routing control apparatus 20 will be explained.
(2-3-1) Example 2-1 (S21 to S23)

FIG. 3 is a diagram showing the third example of the overall configuration and processing flow of a load distribution system including a policy determination apparatus 10 according to the present embodiment. In the exemplary processing flow of FIG. 3, the routing control apparatuses 20A, 20B, . . . are adopted as examples of the routing control apparatuses 20. In particular, FIG. 3 shows a flow of a process in which, when the end user 50A is trying to access the origin server 60 to request distribution of a content, the routing control apparatus 20A designates the edge server 70A as a routing destination. The routing control apparatus 20 may correspond to an L7 load balancer (also referred to as an HTTP load balancer). Steps S10 to S12 in FIG. 3 are the same as steps S10 to S12 in FIGS. 1 and 2, and therefore these steps are omitted from the explanation.

When the end user 50A is trying to access the origin server (data server) 60 to request distribution of a content, the routing control according to Example 2 is performed as indicated below. It is assumed here that the end user 50A is connected to the routing control apparatus 20A of a specific zone #1 with a scheme such as DNS name resolution or anycast.

First, at step S21, the end user 50A sends, as an access request, an HTTP request to the routing control apparatus 20A. The routing control apparatus 20A receives the HTTP request, and acquires the address information included in this HTTP request.

Next, at step S22, the routing control apparatus 20A selects the edge server 70A as a routing destination in accordance with the policy generated by the policy determination apparatus 10, and transfers the HTTP request to the edge server 70A. Here, the routing control apparatus 20A may take into consideration, in addition to the policy, the description of the request included in the HTTP request, the type of target data, information of the end user 50A and the like when selecting the routing destination. If the edge server 70A holds the cache of the content requested by the end user 50A, the process is terminated.

If the edge server 70A does not hold the cache of the content requested by the end user 50A, the edge server 70A transfers the request to the origin server 60 at step S23.

In this manner, the routing destination designated by the routing control apparatus 20A is allowed to deliver the content held by the origin server 60 to the end user 50A.

(2-3-2) Example 2-2 (S21 to S53)

FIG. 4 is a diagram showing the fourth example of the overall configuration and processing flow of the load distribution system including the policy determination apparatus 10 according to the present embodiment. In particular, FIG. 4 shows a flow of a process in which, when the end user 50A is trying to access the origin server 60 to request distribution of a content, the routing control apparatus 20A designates the CDN 100 instead of an edge server 70 as a routing destination. Steps S10 to S12 in FIG. 4 are the same as steps S10 to S12 in FIGS. 1 to 3, and therefore these steps are omitted from the explanation. Furthermore, step S21 in FIG. 4 is the same as step S21 in FIG. 3, and therefore this step is omitted from the explanation.

At step S52, which follows step S21, the routing control apparatus 20A selects the CDN 100B as a routing destination in accordance with the policy determined by the policy determination apparatus 10, and transfers the HTTP request to the CDN 100B. Here, the routing control apparatus 20A may take into consideration, in addition to the policy, the description of the request included in the HTTP request, the type of target data, information of the end user 50A and the like when selecting the routing destination. If the edge server to which the HTTP request is transferred in the CDN 100B holds the cache of the content requested by the end user 50A, the process is terminated.

If the edge server in the CDN 100B does not hold the cache of the content requested by the end user 50A, this edge server further transfers the request to the origin server 60 at step S53.

In this manner, the routing destination designated by the routing control apparatus 20A is allowed to deliver the content held by the origin server 60 to the end user 50A.

At step S22, the routing control apparatus 20A may designate the origin server 60 instead of an edge server as a routing destination.

When the end user 50 wishes to upload data to the origin server 60, the end user 50 equally needs to send a request to the origin server 60 or a suitable edge server. The above flow is therefore applicable regardless of whether the flow of the targeted data of a request is in a downstream direction or upstream direction.

The routing control system 1 including the routing control apparatuses 20A, 20B, . . . explained above with reference to FIGS. 3 and 4 is configured to control the routing destination of an HTTP request from an end user 50 in a dynamic and intelligent manner. That is, the policy determination apparatus 10 serves as the brain to dynamically determine the policy based on the collected monitoring data. The routing control apparatus 20 arranged in each zone performs the actual operation, selecting a suitable routing destination from a plurality of edge servers in accordance with the policy defined by the policy determination apparatus 10 serving as the brain.

The routing control system 1 may be configured to select a routing destination in accordance not only with the policy but also with the information included in the HTTP request. In general, an HTTP request includes information of the end user 50 and information relating to the to-be-transmitted data. The routing control system 1 therefore may be configured to change the routing destination in accordance with the device type or agent of the end user 50 or the type or content of the transmission target data.

With respect to the edge servers to which nonzero proportions are assigned according to the policy, the routing control apparatus 20 in the routing control system 1 may use these proportional values as weights for the weighted round robin when sorting the requests. The policy determination apparatus 10 in the routing control system 1 may determine different policies for different time frames, for example between daytime and nighttime.

In particular, when viewed from the content side, the available services and functions vary among CDNs 100 provided by different CDN business operators. The requests, which have been received at the CDNs 100 of the CDN business operators, are routed using the routing control apparatus 20 to specific edge servers 70. In this manner, the aforementioned variations may be unnoticeable from the content side.

(2-4) Operation of Policy Determination Apparatus

Figure 11:
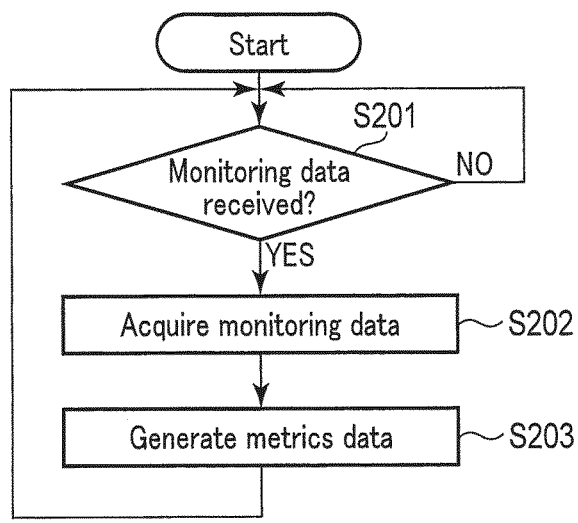
FIG. 11 is a flowchart showing an exemplary operation performed by the policy determination apparatus of FIG. 5 in relation to metrics data.

FIG. 11 shows an exemplary operation performed by the policy determination apparatus 10 in relation to metrics data. In the exemplary operation of FIG. 11, the communication I/F 110 awaits reception of monitoring data (step S201). Upon receipt of the monitoring data by the communication I/F 110, the process proceeds to step S202.

At step S202, the monitoring data acquisition unit 121 acquires the received monitoring data, and writes it into the monitoring data storage unit 141. Then, the metrics generation unit 122 generates metrics data based on the monitoring data acquired at step S202 (step S203). For instance, the metrics generation unit 122 may generate metrics data that includes a new time stamp, and metrics and/or score values of the metrics. After step S203, the communication I/F 110 awaits monitoring data (step S201).

Figure 12:
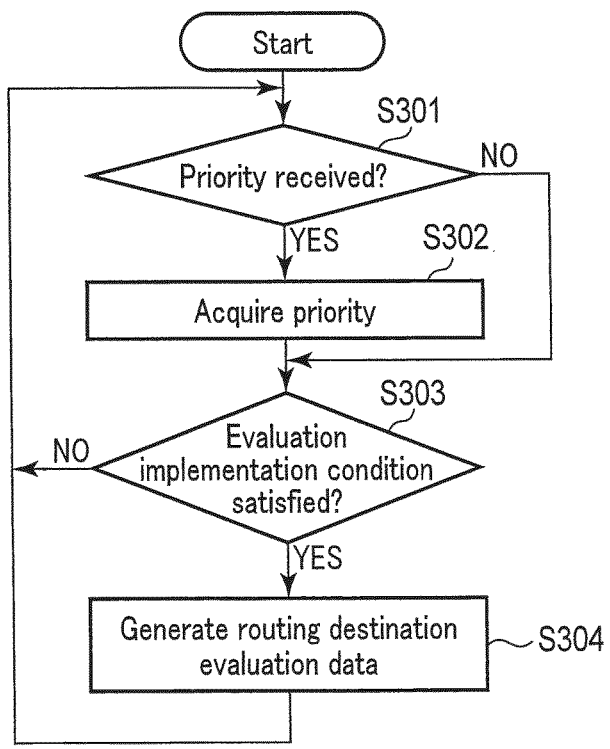
FIG. 12 is a flowchart showing an exemplary operation performed by the policy determination apparatus of FIG. 5 in relation to routing destination evaluation data.

FIG. 12 shows an exemplary operation performed by the policy determination apparatus 10 in relation to the routing destination evaluation data. In the exemplary operation of FIG. 12, the communication I/F 110 awaits reception of priority (step S301), and the routing destination evaluation unit 126 waits for an evaluation implementation condition to be satisfied (step S303). If the routing destination evaluation unit 126 is configured to evaluate routing destination candidates at regular intervals, the evaluation implementation condition may represent a predetermined period of time being elapsed after the previous implementation. The evaluation implementation condition may be that the routing destination evaluation unit 126 receives a request for implementing an evaluation from the policy determination unit 127. When the priority is received, the process proceeds to step S302, and when the evaluation implementation condition is satisfied, the process proceeds to step S304.

At step S302, the priority acquisition unit 123 acquires the received priority, and writes it into the setting data storage unit 143. After step S302, the communication I/F 110 awaits reception of a priority (step S301), and the routing destination evaluation unit 126 awaits the satisfaction of the evaluation implementation condition (step S303).

At step S304, the routing destination evaluation unit 126 evaluates a plurality of routing destination candidates based on the metrics data stored in the metrics storage unit 142, parameters including the priorities stored in the setting data storage unit 143, and the like to generate the routing destination evaluation data. After step S304, the communication I/F 110 awaits reception of a priority (step S301), and the routing destination evaluation unit 126 awaits the satisfaction of the evaluation implementation condition (step S303).

FIG. 13 shows an exemplary operation performed by the policy determination apparatus 10 in relation to the policy. In the exemplary operation of FIG. 13, the update condition determination unit 124 awaits the satisfaction of the policy update condition (step S401). When it is determined that the policy update condition is satisfied, the process proceeds to step S402.

At step S402, the update request unit 125 requests the policy determination unit 127 to update the policy. In response to the request made at step S402, the policy determination unit 127 requests the evaluation providing unit 128 to provide the customer device with the routing destination evaluation data, and the evaluation providing unit 128 provides the customer device with the routing destination evaluation data stored in the evaluation data storage unit 145 (step S403). The operation at step S403 is optional, which may be omitted together with the later described steps S404, S405 and S406. If this is the case, the process proceeds from step S402 to step S407.

After step S403, the communication I/F 110 awaits the reception of weights over a predetermined period of time (step S404). When the communication I/F 110 receives weights, the process proceeds to step S405, while when the communication I/F 110 does not receive weights, the process proceeds to step S407.

At step S405, the weight acquisition unit 129 acquires the received weights, and writes them into the weight storage unit 144. Next, the policy determination unit 127 determines a new policy based on the weights acquired at step S405 (step S406). The policy determination unit 127 may describe the weights as they are in the policy, or determine as the weight of each candidate the ratio of the weight of the candidate to the total sum of the weights assigned to all the routing destination candidates. After step S406, the process proceeds to step S408.

At step S407, the policy determination unit 127 reads the routing destination evaluation data from the evaluation data storage unit 145, and determines the new policy based on the scores of the routing destination candidates included in this data. For instance, the policy determination unit 127 may determine, as the weight of each candidate, the ratio of the score of the candidate to the total score of all the routing destination candidates to be included in the policy. After step S407, the process proceeds to step S408.

At step S408, the policy notification unit 130 notifies the routing control apparatus 20 of the policy determined at step S406 or S407. After step S408, the update condition determination unit 124 awaits the satisfaction of the policy update condition (step S401).

(2-5) Determination of Time Slot-Specific Policy

Figure 14:
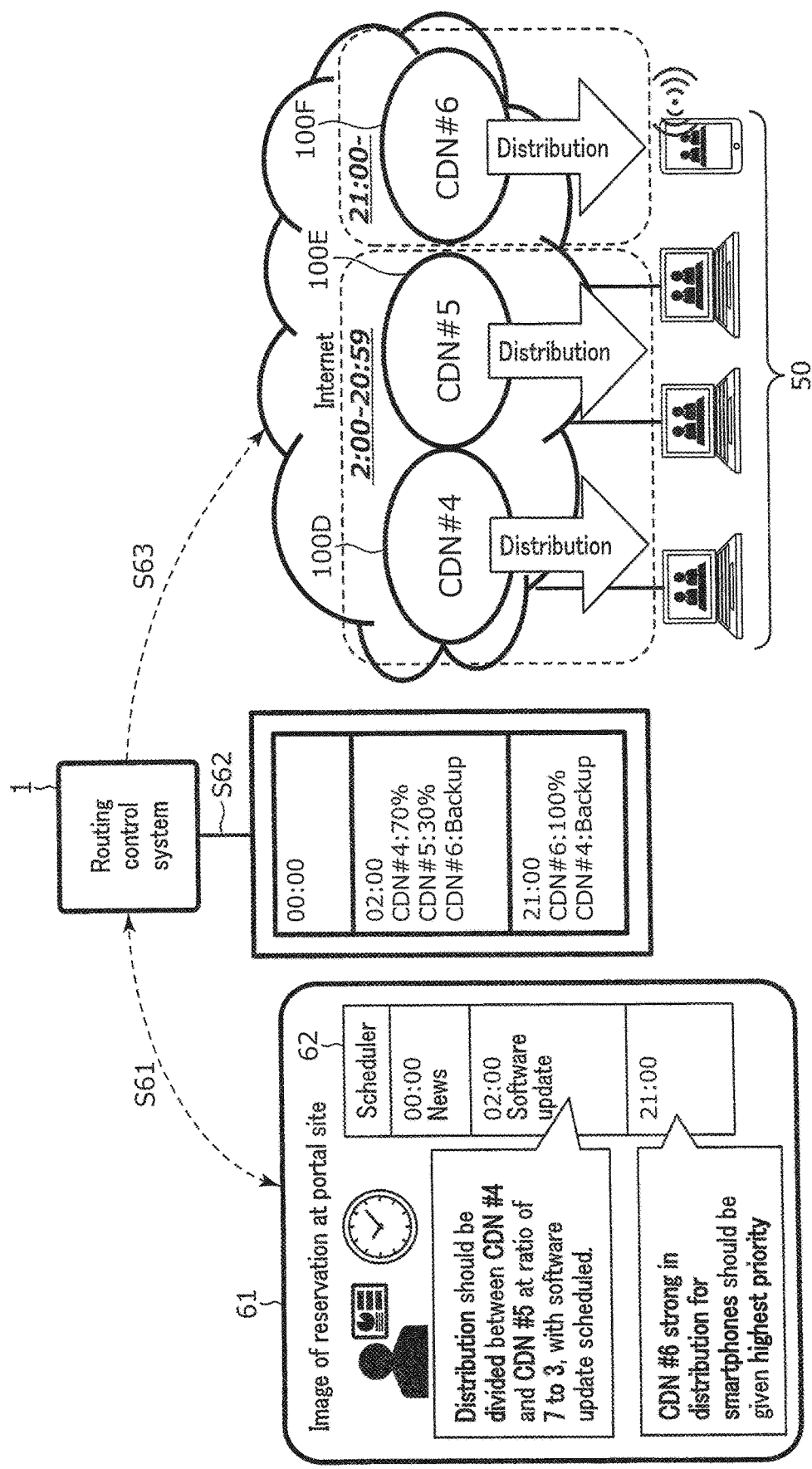
FIG. 14 is a diagram showing an exemplary time-slot specific policy determination established by the policy determination apparatus according to the embodiment.

FIG. 14 is a diagram showing an exemplary determination of a time slot-specific policy by the policy determination apparatus 10 according to the present embodiment.

The operator of the origin server 60 accesses the portal site 61 with a customer device to check the data distribution schedule of the origin server 60 described in a scheduler 62 displayed on this site. The operator now understands that an update software program will be distributed in a time slot between 02:00 to 20:59. Furthermore, the operator may expect that content distribution targeted for smart phones corresponding to the end users 50 will increase in a time slot (nighttime) between 21:00 and 23:59. The operator therefore inputs the assignment to the form on the portal site 61 such that the CDN 100D and CDN 100E will be selected as routing destination candidates for the time slot between 02:00 and 20:59, with the proportions of "0.7" and "0.3" assigned respectively to the CDN 100D and CDN 100E; whereas the CDN 100F, which is suitable for content distribution to smart phones, will be selected as a routing destination candidate for the time slot between 21:00 and 23:59, with the proportion of "1" assigned to the CDN 100F. The customer device issues weights in accordance with the operator's input, and transmits them to the policy determination apparatus 10 (step S61).

At step S62, the policy determination apparatus 10 determines, for each of the time slots, a policy based on the weights received from the customer device. These weights may include first weights to be assigned to the routing destinations in the time slot between 02:00 and 20:59, and second weights to be assigned to the routing destinations in the time slot between 21:00 and 23:59. In particular, the policy determination apparatus 10 determines a policy based on the first weights such that the routing control apparatus 20 will route requests to the CDN 100D and CDN 100E at a ratio of 7:3 in the time slot between 02:00 and 20:59, and determines a policy based on the second weights such that the routing control apparatus 20 will route requests to the CDN 100F at a ratio of 100% in the time slot between 21:00 and 23:59. In the example of FIG. 14, the CDN 100F is determined to serve as a backup in the time slot between 02:00 and 21:00. Furthermore, the CDN 100D is determined to serve as a backup in the time slot between 21:00 and 23:59. In the example of FIG. 14, the policy between 00:00 and 01:59 is left blank. The policy for this time slot may be automatically determined by the policy determination apparatus 10 based on the routing destination evaluation data.

Next, at step S63, the routing control apparatus 20 selects or switches edge servers (CDNs) in accordance with such policies for the respective time slots. For instance, the routing control apparatus 20 controls the routing based on the policies for the respective time slots such that the distribution is conducted by the CDN 100D and CDN 100E in a divided manner at a ratio of 7 to 3 in the time slot between 2:00 and 20:59, and by the CDN 100F in the time slot between 21:00 and 23:59.

As a modification example, the policy determination apparatus 10 may adjust the priorities (standard values) assigned to the metrics and/or the proportions assigned to the edge servers based on the data distribution schedule of the origin server 60.

(2-6) Multistep Routing Control

Figure 15:
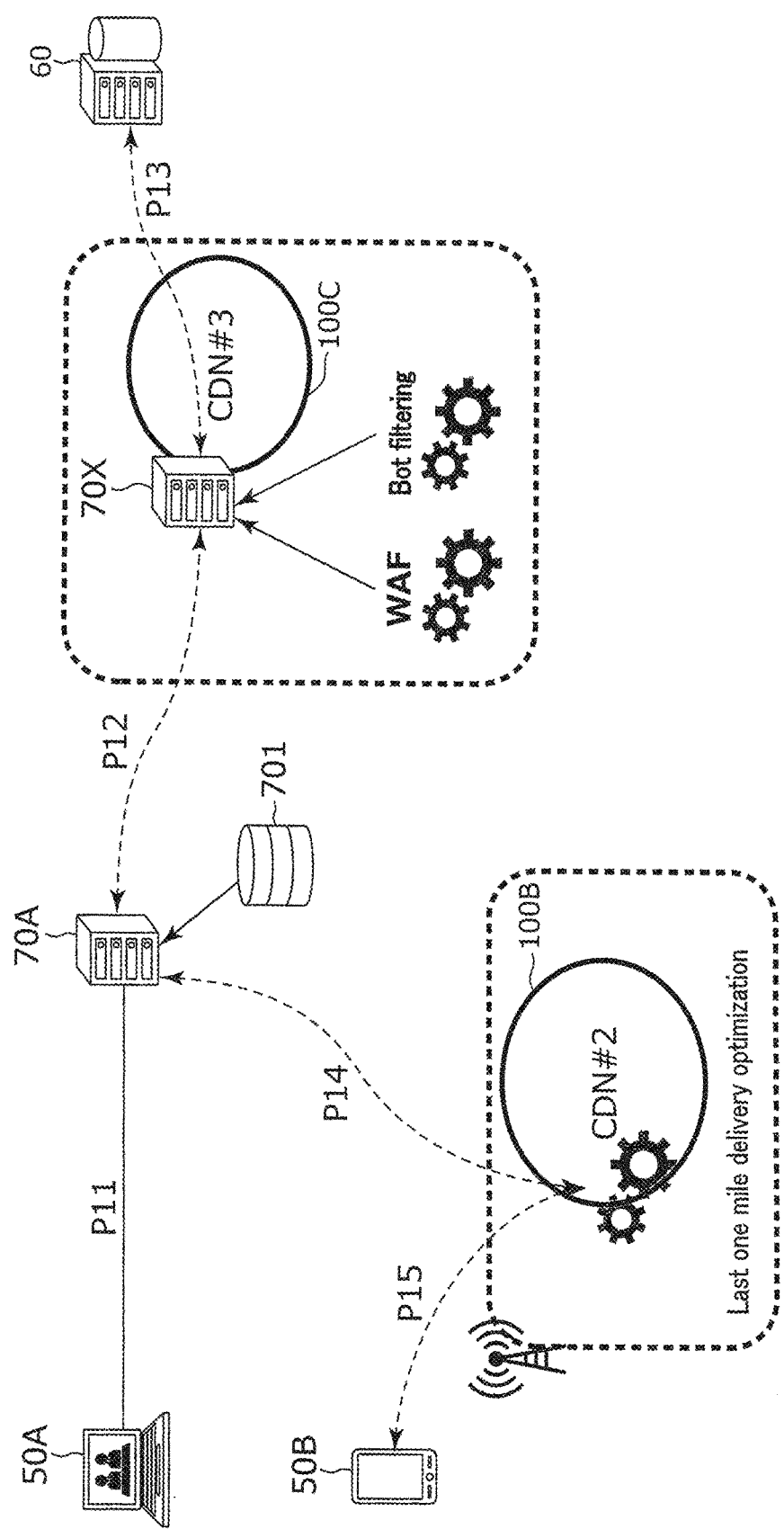
FIG. 15 is a diagram for showing an exemplary multi-stage control performed by the policy determination apparatus according to the embodiment.

FIG. 15 is a diagram showing an example of multistep routing control performed by the policy determination apparatus 10 according to the present embodiment.

In FIG. 15, an access request transmitted by the end user 50A is routed by the routing control system 1 to the edge server 70A (P11), and then routed to the CDN 100C (P12). The edge server 70A transfers the access request to the origin server 60 by way of the edge server (intermediate server) 70X included in the CDN 100C (P12, P13), and caches the necessary data in the cache 701 to deliver the content to the end user 50A.

By conducting two-step routing control, the data transmission between the end user 50A and origin server 60 can be realized via two edge servers, namely the edge server 70A and CDN 100C. In this manner, a security function that is not sufficiently attained, for example, by the edge server 70A only, can be supplemented by the function provided by the CDN 100C. That is, with the intermediate server 70X of the CDN 100C adopted, data distribution through the Web Application Firewall (WAF) and bot filtering function of the CDN 100C can be realized.

Alternatively, for the end user 50B, the content distribution from the cache 701 of the edge server 70A is routed not directly from the edge server 70A, but by way of the CDN 100B. As a result, a highly reliable content distribution can be realized by way of the CDN 100B having an edge server that is located geographically close to the end user 50B. This optimizes the so-called last one mile.

The above multistep routing control is not limited to the two-step control as illustrated in FIG. 15, and routing control incorporating three steps, four steps or any number of steps can be performed.

Advantageous Effects

As described above, the policy determination apparatus according to the present embodiment generates time-series data of a plurality of types of metrics associated with each of routing destination candidates to which the routing control apparatus routes requests, and evaluates the candidates based on this time-series data to generate routing destination evaluation data. After generating the routing destination evaluation data, the policy determination apparatus determines a policy to be used by the routing control apparatus for controlling the routing destinations, based on the weights set by a customer device to which the routing destination evaluation data is provided, or on the routing destination evaluation data. According to this policy determination apparatus, the policy can be dynamically determined.

In addition, the user (customer) of the customer device can freely set the priorities, which are the parameters for determining the influence of each value of the metrics upon the evaluation. Thus, the policy determination apparatus can provide the customer with routing destination evaluation data generated in accordance with the standards that suit the customer's preference, and/or can determine a policy that suits the customer's preference.

Furthermore, the customer may set different priorities and/or different weights for different time slots. In this manner, the policy determination apparatus can provide the routing destination evaluation data generated in accordance with the standards that suit the customer's preference for each time slot, and/or can determine the policy that suits the customer's preference.

In addition, an edge server 70 through which the contents pass may offer various additional functions. For instance, by monitoring and analyzing the state of the network, and by dynamically inserting functions as needed, the distribution quality can be enhanced. Examples of additional functions include speed enhancement (FEO, last one mile delivery optimization, WAN optimization), processing division (SSL offloading, disk (cache)), protocol distribution (protocol conversion, v4/v6 conversion), and security function (WAF, bot filtering, API security). The policy determination apparatus according to the present embodiment, which is configured to determine a policy for selecting a routing destination such that the process is conducted by way of an edge server or CDN having such a strength, can easily offer additional functions. With the policy determination apparatus determining a policy of selecting a routing destination in a multistep manner, a plurality of additional functions can be combined and provided.

With the policy determination apparatus determining a policy of selecting a routing destination in a multistep manner, variations in functions between the service providers can be hidden. For instance, when the same content is distributed from a plurality of business operators, similar functions may be provided by CDN business operators since functions such as content purging are highly demanded by content business operators. In such a case, differences in specifications among the operators can be absorbed (hidden), realizing operations in a collective manner. That is, instead of having an end user directly access the origin server from the selected CDN, the policy determination apparatus routes the end user by way of another edge server so that the specifications of the CDN are not visible for the origin server.

Other Embodiments

The present invention is not limited to the above embodiments.

For instance, the routing control system 1 has been explained as having a policy determination apparatus 10 and a routing control apparatus 20 as separate devices, but this is not a limitation. The policy determination apparatus 10 and the routing control apparatus 20 may be configured as an integrated device.

In the explanation, the policies are established for each zone, which is not a limitation. The policies may be established commonly among zones, or may be established in coordination among zones.

The specific method for generating policies can be modified in various manners without departing from the spirit of the present invention.

The present invention should not be limited to the above-described embodiments as-is, but may be embodied by modifying the components without departing from the scope of the invention at the implementation stage. In addition, various inventions may be constituted by appropriately combining a plurality of components disclosed in the embodiments. For example, some components may be omitted from the components shown in the embodiments. Furthermore, the components of different embodiments may be suitably combined.

REFERENCE SIGNS LIST

1 Routing control system
10 Policy determination apparatus
20, 20A, 20B, 30, 30A, 30B Routing control apparatus
41 Probe server
42 Monitoring system
50, 50A, 50B End user
60 Origin server
61 Portal site
62 Scheduler
70, 70A, 70B, 70C Edge server
70X Intermediate server
80 DNS resolver
90 Authoritative DNS server
100, 100A, 100B, 100C CDN
110 Communication I/F
120 Processor
121 Monitoring data acquisition unit
122 Metrics generation unit
123 Priority acquisition unit
124 Update condition determination unit
125 Update request unit
126 Routing destination evaluation unit
127 Policy determination unit
128 Evaluation providing unit
129 Weight acquisition unit
130 Policy notification unit
140 Memory
141 Monitoring data storage unit
142 Metrics storage unit
143 Setting data storage unit
144 Weight storage unit
145 Evaluation data storage unit
146 Policy storage unit
701 Cache

The invention claimed is:

1. A policy determination apparatus comprising:
a monitoring data acquisition unit configured to acquire monitoring data relating to states of facilities on a network, the monitoring data being received from an external device;
a metrics generation unit configured to generate, based on the monitoring data, time-series data of a plurality of types of metrics associated with each of a plurality of candidates of routing destinations to which a routing control apparatus routes requests including first destination data;
a routing destination evaluation unit configured to evaluate the candidates based on the time-series data of the types of metrics associated with the candidates and priorities assigned to the types of metrics to generate routing destination evaluation data;
an evaluation providing unit configured to provide a first customer device with the routing destination evaluation data, the first customer device being authorized to set weights for determining a policy;
a weight acquisition unit configured to acquire weights transmitted by the first customer device in response to reception of the routing destination evaluation data by the first customer device;
a policy determination unit configured to generate or update a policy that the routing control apparatus uses for control of the routing destinations such that the routing control apparatus routes the requests to the candidates in proportions being based on the acquired weights;
a policy notification unit configured to notify the routing control apparatus of the policy;
an update condition determination unit configured to determine whether or not a predetermined policy update condition is satisfied; and
an update request unit configured to issue a policy update request when the policy update condition is determined to be satisfied,
wherein the policy determination unit is configured to request, in response to the policy update request, the evaluation providing unit to provide the first customer device with a latest version of the routing destination evaluation data.

2. The policy determination apparatus according to claim 1, wherein
the routing destination evaluation unit is configured to calculate, for each of the candidates, an evaluation value of the candidate by adding values weighted in accordance with the priorities, the values being based on the time-series data of the types of metrics corresponding to the candidate.

3. The policy determination apparatus according to claim 1, wherein
the weights received from the first customer device include first weights to be assigned to the candidates in a first time slot, and second weights to be assigned to the candidates in a second time slot that differs from the first time slot, and
the policy determination unit is configured to generate or update the policy such that the routing control apparatus routes the requests to the candidates in proportions being based on the first weights over the first time slot, and routes the requests to the candidates in proportions being based on the second weights over the second time slot.

4. The policy determination apparatus according to claim 1, wherein
the routing destination evaluation data includes evaluation values of the candidates, and
the policy determination unit is configured to, when the weights are not acquired from the first customer device, generate or update the policy such that the routing control apparatus routes the requests to the candidates in proportions being based on the evaluation values.

5. The policy determination apparatus according to claim 1, further comprising:
a priority acquisition unit configured to acquire priorities received from a second customer device authorized to set the priorities,
wherein the routing destination evaluation unit is configured to evaluate the candidates based on the time-series data of the types of metrics associated with the candidates and the acquired priorities to generate the routing destination evaluation data.

6. The policy determination apparatus according to claim 5, wherein
the routing destination evaluation data includes evaluation values of the candidates, and
the policy determination unit is configured to generate or update the policy such that the routing control apparatus routes the requests to the candidates in proportions being based on the evaluation values.

7. The policy determination apparatus according to claim 1, wherein
the types of metrics associated with a first candidate included in the candidates include first metrics relating to a transmission cost of a request when the first candidate is selected as a routing destination, and second metrics relating to a transmission quality of the request when the first candidate is selected as the routing destination.

8. A non-transitory computer readable medium storing a computer program which is executed by a computer to provide the steps of:
acquiring monitoring data relating to states of facilities on a network, the monitoring data being received from an external device;
generating, based on the monitoring data, time-series data of a plurality of types of metrics associated with each of a plurality of candidates of routing destinations to which a routing control apparatus routes requests including first destination data;
evaluating the candidates based on the time-series data of the types of metrics associated with the candidates and priorities assigned to the types of metrics to generate routing destination evaluation data;
providing a first customer device with the routing destination evaluation data, the first customer device being authorized to set weights for determining a policy;
acquiring weights transmitted by the first customer device in response to reception of the routing destination evaluation data by the first customer device;
generating or updating a policy that the routing control apparatus uses for control of the routing destinations such that the routing control apparatus routes the requests to the candidates in proportions being based on the acquired weights;
notifying the routing control apparatus of the policy;
determining whether or not a predetermined policy update condition is satisfied; and
issuing a policy update request when the policy update condition is determined to be satisfied,
wherein the generating or updating the policy comprises requesting, in response to the policy update request, to provide the first customer device with a latest version of the routing destination evaluation data.

9. A policy determining method comprising:
acquiring monitoring data relating to states of facilities on a network, the monitoring data being received from an external device;
generating, based on the monitoring data, time-series data of a plurality of types of metrics associated with each of a plurality of candidates of routing destinations to which a routing control apparatus routes requests including first destination data;
evaluating the candidates based on the time-series data of the types of metrics associated with the candidates and priorities assigned to the types of metrics to generate routing destination evaluation data;
providing a first customer device with the routing destination evaluation data, the first customer device being authorized to set weights for determining a policy;
acquiring weights transmitted by the first customer device in response to reception of the routing destination evaluation data by the first customer device;
generating or updating a policy that the routing control apparatus uses for control of the routing destinations such that the routing control apparatus routes the requests to the candidates in proportions being based on the acquired weights;
notifying the routing control apparatus of the policy;
determining whether or not a predetermined policy update condition is satisfied; and
issuing a policy update request when the policy update condition is determined to be satisfied,
wherein the generating or updating the policy comprises requesting, in response to the policy update request, to provide the first customer device with a latest version of the routing destination evaluation data.

* * * * *